US012645611B2

(12) United States Patent  
Lempel

(10) Patent No.: US 12,645,611 B2  
(45) Date of Patent: **\*Jun. 2, 2026**

(54) ARCHITECTURE, SYSTEM AND METHODS THEREOF FOR SECURE COMPUTING USING HARDWARE SECURITY CLASSIFICATIONS

(71) Applicant: Lempel Mordkhai, Caesarea (IL)

(72) Inventor: Mordkhai Lempel, Caesarea (IL)

(73) Assignee: Lempel Mordkhai, Caesarea (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/904,613

(22) Filed: Oct. 2, 2024

(65) Prior Publication Data

US 2025/0021495 A1 Jan. 16, 2025

Related U.S. Application Data

(63) Continuation of application No. 17/646,209, filed on Dec. 28, 2021, now Pat. No. 12,135,657.

(60) Provisional application No. 63/131,077, filed on Dec. 28, 2020.

(51) Int. Cl.  
*G06F 12/14* (2006.01)  
*G06F 12/0831* (2016.01)  
*G06F 12/0882* (2016.01)

(52) U.S. Cl.  
CPC ...... *G06F 12/1458* (2013.01); *G06F 12/0835* (2013.01); *G06F 12/0882* (2013.01); *G06F 12/1433* (2013.01); *G06F 12/145* (2013.01)

(58) Field of Classification Search  
None  
See application file for complete search history.

(56) References Cited

U.S. PATENT DOCUMENTS

| | | | |
|---|---|---|---|
| 5,369,702 | A | 11/1994 | Shanton |
| 5,680,452 | A | 10/1997 | Shanton |
| 5,717,755 | A | 2/1998 | Shanton |
| 5,898,781 | A | 4/1999 | Shanton |
| 6,125,447 | A | 9/2000 | Gong |
| 7,065,654 | B1 | 6/2006 | Gulick et al. |

(Continued)

OTHER PUBLICATIONS

"Control-flow Enforcement Technology Specification", Document No. 334525-003, Intel Corporation, May 2019, Revision 3.0.

(Continued)

*Primary Examiner* — Yaima Rigol  
(74) *Attorney, Agent, or Firm* — M&B IP Analysts, LLC

(57) ABSTRACT

A system for secured computing comprises: an interconnect; a processing element communicatively connected to the interconnect; and a memory controller communicatively connected to the interconnect and to a memory; wherein access of a memory block by the memory controller to and from the interconnect is accompanied by a security class of a plurality of security classes; wherein each memory block is associated with a security class assigned to the content stored in the memory block from amongst a plurality of security classes; wherein the associated security class of each memory block travels in the system together with the content of the associated memory block; wherein the memory controller employs at least one matrix; and wherein the at least one matrix defines interactions between the security classes of memory blocks of content as the content of the memory blocks which are being handled by at least the memory controller.

19 Claims, 19 Drawing Sheets

(56) References Cited

U.S. PATENT DOCUMENTS

| | | | |
|---|---|---|---|
| 7,660,999 | B2 | 2/2010 | Kudallur et al. |
| 7,921,288 | B1 | 4/2011 | Hildebrand |
| 7,970,900 | B2 | 6/2011 | Holden et al. |
| 8,341,406 | B2 | 12/2012 | Hildebrand |
| 8,341,407 | B2 | 12/2012 | Kinghorn et al. |
| 8,473,754 | B2 | 6/2013 | Jones et al. |
| 8,543,827 | B2 | 9/2013 | Garcia et al. |
| 8,646,078 | B2 | 2/2014 | Kudallur et al. |
| 8,874,768 | B2 | 10/2014 | Holden et al. |
| 9,015,496 | B2 | 4/2015 | Kudallur et al. |
| 9,438,627 | B2 | 9/2016 | Billau et al. |
| 9,537,898 | B2 | 1/2017 | Billau et al. |
| 9,542,560 | B2 | 1/2017 | Garcia et al. |
| 9,641,511 | B2 | 5/2017 | Dar et al. |
| 9,721,086 | B2 | 8/2017 | Shear et al. |
| 9,800,607 | B2 | 10/2017 | Yu |
| 9,825,983 | B1 | 11/2017 | Yu |
| 9,843,600 | B1 | 12/2017 | Yu |
| 9,971,894 | B2 | 5/2018 | Shear et al. |
| 10,229,279 | B2 | 3/2019 | Garcia et al. |
| 10,509,907 | B2 | 12/2019 | Shear et al. |
| 10,581,852 | B2 | 3/2020 | Schaffner et al. |
| 10,742,421 | B1 | 8/2020 | Wentz et al. |
| 2006/0236408 | A1 | 10/2006 | Yan |
| 2012/0093237 | A1 | 4/2012 | Stewart |
| 2014/0089682 | A1 | 3/2014 | Gulati et al. |
| 2015/0268974 | A1 | 9/2015 | Goebel et al. |
| 2017/0118180 | A1 | 4/2017 | Takahashi |
| 2017/0180408 | A1 | 6/2017 | Yu |
| 2019/0377907 | A1 | 12/2019 | Fu et al. |
| 2020/0151324 | A1 | 5/2020 | Walker et al. |
| 2020/0218799 | A1 | 7/2020 | Boivie et al. |
| 2020/0226296 | A1 | 7/2020 | Pan et al. |
| 2021/0294393 | A1 | 9/2021 | Foustok |

OTHER PUBLICATIONS

Chow, J., Pfaff, B., Garfinkel, T., Christopher, K. and Rosenblum, M., "Understanding Data Lifetime via Whole System Simulation", SSYM'04 Proceedings of the 13th conference on USENIX Security Symposium, San Diego, CA, Aug. 9-13, 2004, vol. 13.

Dalton, M., Kannan, H. and Kozyrakis, C., "Deconstructing Hardware Architectures for Security", 5th Annual Workshop on Duplicating, Deconstructing, and Debunking (WDDD) at ISCA (2006).

Dalton, M., Kannan, H. and Kozyrakis, C., "Raksha: A Flexible Information Flow Architecture for Software Security", ISCA (Intl Symposium on Computer Architecture) Jun. 9-13, 2007, San Diego, vol. 35(2).

F. Y. Rashid, "The Rise of Confidential Computing: Big Tech Companies are Adopting a New Security Model to Protect Data While It's In Use", IEEE Spectrum, vol. 57, No. 6, pp. 8-9, Jun. 2020.

Gilman, E. and Barth, D., "Zero Trust Networks", O'Reilly Media, Inc., 2017, pp. 1-4.

Hu, H., Shinde, S., Adrian, S., Chua, Z.L., Saxena, p. and Liang, Z., "Data-Oriented Programming: On the Expressiveness of Non-control Data Attacks", 2016 IEEE Symposium on Security and Privacy (SP), San Jose, CA, 2016, pp. 969-986.

Kiriansky, V., Bruening, D. and Amarasinghe, S., "Secure Execution Via Program Shepherding ", Proceedings of the 11th USENIX Security Symposium, San Francisco, CA, USA, Aug. 5-9, 2002.

Lee, R.B., Karig, D.K., McGregor, J.P and Shi, Z., "Enlisting Hardware Architecture to Thwart Malicious Code Injection", Security in Pervasive Computing. Lecture Notes in Computer Science, vol. 2802, pp. 237-252.

Nicolaou, N., "Confidential Computing in the Cloud", 2019.

Saal, H.J. and Gat, I., "A Hardware Architecture for Controlling Information Flow", ISCA '78: Proceedings of the 5th annual symposium on Computer architecture, Apr. 1978, pp. 73-77.

Suh, G.E., Lee, J.W., Zhang, D. and Devadas, S., "Secure Program Execution via Dynamic Information Flow Tracking", ASPLOS XI: Proceedings of the 11th international conference on Architectural support for programming languages and operating systems, Oct. 2004, pp. 85-96.

Szekeres, L., Payer, M., Wei, T. and Song, D., "SoK: Eternal War in Memory", 2013 IEEE Symposium on Security and Privacy, Berkeley, CA, USA USA, 2013 pp. 48-62.

Vachharajani, N., Brdiges, M.J., Chang, J., Rangan, R., Ottoni, G., Blome, J.A., Reis, G.A., Vachharajani, M. and August, D.I., "RIFLE: An Architectural Framework for User-Centric Information-Flow Security", 7th International Symposium on Microarchitecture (MICRO-37'04), Portland, OR, USA, 2004, pp. 243-254.

Venkataramani, G., Doudalis, I., Solihin, Y. and Prvulovic, M., "FlexiTaint: A Programmable Accelerator for Dynamic Taint Propagation" 2008 IEEE 14th International Symposium on High Performance Computer Architecture, Salt Lake City, UT, 2008, pp. 173-184.

Xu, J., Kalbarczyk, Z., Patel, S. and Iyer, R.K., "Architecture Support for Defending Against Buffer Overflow Attacks", Proc. 2nd Workshop on Evaluating and Architecting System Dependability (EASY 02), 2002.

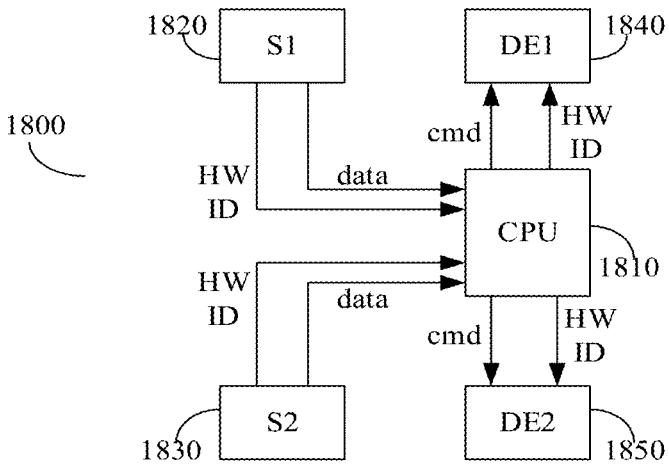
FIGURE 18
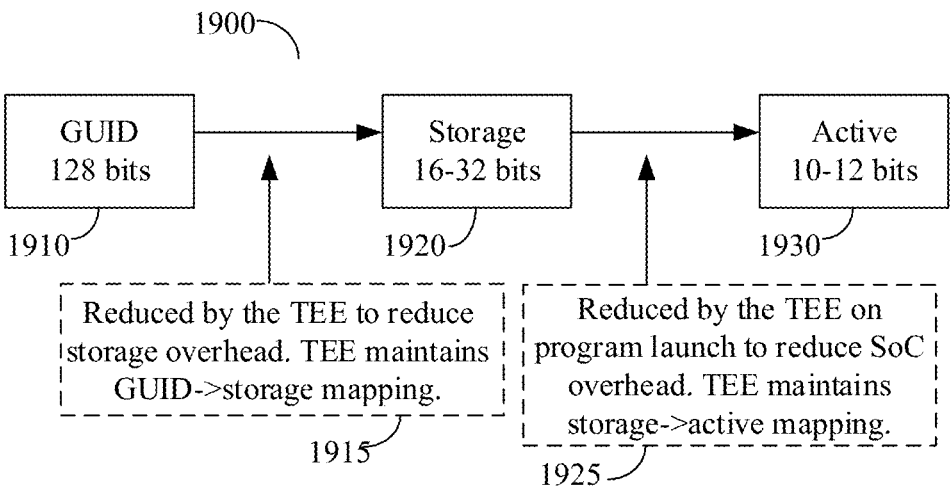
FIGURE 19
FIGURE 20

| Thread 1 | empty | Thread 2 | empty | empty | Thread 3 |
|----------|-------|----------|-------|-------|----------|

2000

Context 1 — 2110-1

Context 2 — 2110-2

Context 3 — 2110-3

Context n — 2110-n

2100

2200

2210 first | 10

2220

| | | | | 10 | | 4 | | | 6 | -1 | | last | 9

2230

| 0 | 1 | 2 | 3 | 4 | 5 | 6 | 7 | 8 | 9 | 10 | 11 |

2240

ARCHITECTURE, SYSTEM AND METHODS THEREOF FOR SECURE COMPUTING USING HARDWARE SECURITY CLASSIFICATIONS

CROSS-REFERENCE TO RELATED APPLICATIONS

This application is a continuation application of U.S. patent application Ser. No. 17/646,209, filed on Dec. 28, 2021, now allowed, which in turn claims the benefit of U.S. Provisional Application No. 63/131,077 filed on Dec. 28, 2020, the contents of each of which are hereby incorporated by reference.

TECHNICAL FIELD

The present disclosure relates to computing environments and more specifically to secure computing environments that interact with external systems communicatively connected thereto.

BACKGROUND

Securing data and code in systems is an increasing challenge for enterprises of practically any size these days. Malicious attacks are commonplace that result in damages to systems as a result of malware aimed at stealing data and, e.g., ransomware aimed at corrupting data. Over time various solutions have been developed but as clearly evident on practically a daily basis, the perpetrators find the loopholes from which to enter systems and cause significant damage. It is not uncommon to find the need to pay significant amounts of money in ransom to release captured data or, spend the time and resource to recover the system from the damages left after such an attack. It is also common to see reports of data leakage that cause damage to the reputation of the entity from which data was leaked or otherwise referred to as stolen.

There are various solutions to handle the attempts to damage data and code, one of the most common is the use of firewalls. The firewalls attempt to prevent access of mostly known ways of attack and in some cases also are capable of detecting patterns that are common to such attempts. Other means of protection include monitoring system activities and looking for anomalies, whether in real time or off logs. However, each system has its vulnerabilities and hackers are more than happy to find them and exploit them. In most cases the loopholes are closed only once detection is made, and in many cases after at least some damage has occurred.

Sensitive data or code that is retained in memory of a system is vulnerable and hence prior art solutions attempt to continuously protect that data while performing the different operations by the system. While such solutions have their merits, they also have their weaknesses. Their biggest weakness stems from the fact that they are fully or partially software based and almost all attacks attack software vulnerabilities. Of course, once the security is breached, for whatever reason, damage is going to happen. This may be because the protection system did not recognize the malicious penetrator when it entered, or it did not detect the attack, since the executed operations seemed legal. It would therefore be advantageous to provide a solution that provides a level of security to the system that is independent of a case of penetration.

It would be further advantageous to enforce Zero Trust on every instruction and transaction. Zero Trust is described, for example, in Zero Trust Networks by Evan Gilman and Doug Barth. It would further be advantageous to allow easy definition and migration of Trusted Execution Environments (TEEs), a goal behind the Confidential Computing Initiative.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a system for secured computing, comprising: an interconnect; a processing element communicatively connected to the interconnect; and a memory controller communicatively connected to the interconnect and to a memory; wherein access of a memory block by the memory controller to and from the interconnect is accompanied by a security class of a plurality of security classes; wherein each memory block is associated with a security class assigned to the content stored in the memory block from amongst a plurality of security classes; wherein the associated security class of each memory block travels in the system together with the content of the associated memory block; wherein the memory controller employs at least one matrix; and wherein the at least one matrix defines interactions between the security classes of memory blocks of content as the content of the memory blocks which are being handled by at least the memory controller.

BRIEF DESCRIPTION OF THE DRAWINGS

The foregoing and other objects, features and advantages will become apparent and more readily appreciated from the following detailed description taken in conjunction with the accompanying drawings, in which:

FIG. 18 is a block diagram of hardware protection for vehicles using hardware identification for sensor data and driving element commands according to an embodiment;

FIG. 19 is a block diagram for overhead reduction when using a globally unique identifier (GUID) according to an embodiment;

FIG. 20 is a hash table for thread context according to an embodiment;

DETAILED DESCRIPTION

Figure 1:
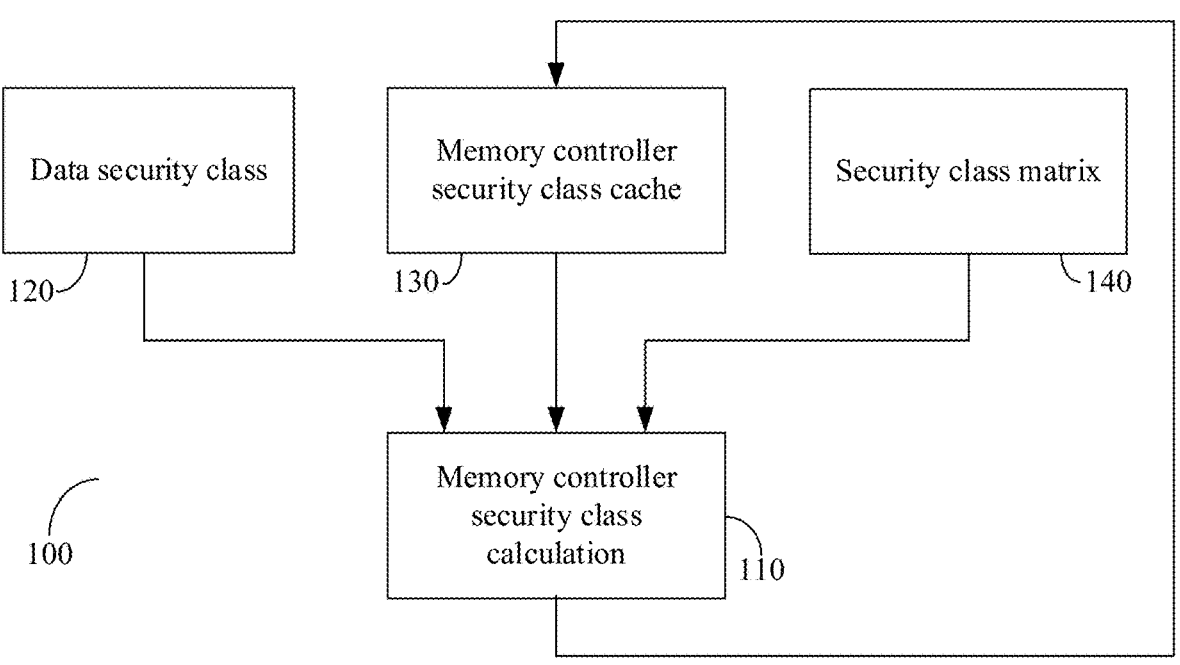
FIG. 1 is a schematic block diagram of a system for determining a security class of a memory block when writing to the memory block according to an embodiment.

Below, various embodiments will be described in detail with reference to accompanying drawings so as to be easily realized by a person having ordinary knowledge in the art. The embodiments may be embodied in various forms without being limited to the embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. Furthermore, the terms "class" and "security class" are used interchangeably and have the same meaning.

A system on chip (SoC) is designed to include a protective moat allowing the external interfaces of the SoC to act as security enforcers. Data is prevented from being delivered to non-trusted devices. Data may leave only to devices that are able to prove they are "friendly sites" (e.g., that they belong to the same organization) and are allowed to receive the security class of the data. Code is prevented from accessing data or jumping to addresses which the code is not authorized to access or jump to. According to an embodiment both data and code are stored (e.g., in non-volatile memory) encrypted according to their security class, each class having a different encryption key. An n-by-n matrix defines the way security classes may mix, specifically when two different security classes are used. This provides for securing data-data, code-code and data-code interactions. During configuration, processor context switching and secure communication a trusted execution environment (TEE) is used. The classification rules matrix is programmable under the TEE. Among others, the architecture described herein achieves in hardware the goals of Security Enhanced Linux (SE Linux), Secure Computing and Zero Trust.

Accordingly, the disclosed embodiments provide a hardware-based security architecture for a SoC that allows for preventing classified data from leaving the system to non-friendly destinations, regardless of the attack; as well as for preventing data corruption. Additionally, the architecture disclosed herein also prevents several known attacks. All of this is to happen in the same framework. Specifically, the SoC implements various components in order to overcome vulnerabilities of existing systems.

Firstly, in an embodiment, every memory page, regardless if it contains data or code, is mapped to a security class.

Secondly, in an embodiment, a set of rules on the allowed interactions between the different security classes is applied to determine the following: i) which data classes can be mixed in an operation, as well as determining the resulting mixed class; ii) whether a code class can process a specific data class, and the resulting class; and, iii) whether a code class can call a specific code class.

Thirdly, in an embodiment, based on the rules of interaction performing the following: i) an update of the security class of data as the data is processed; ii) preventing code from accessing data; and, iii) preventing code from performing a jump to certain other addresses in memory.

Fourthly, in an embodiment, a security context is created based on the calculations that determine the control flow of the program where the security class of data operations is at least the security context.

Fifthly, in an embodiment, the external interfaces of the SoC act as security enforcers that prevent data from leaving the system to untrusted sites, prevent data the SoC is not authorized to receive from entering the SoC, and further prevent code from accessing data in memory blocks with unauthorized, incompatible, security classes. These interfaces therefore act as a hardware moat, i.e., a perimeter barrier, enacted around the SoC.

Sixthly, in an embodiment, data is only permitted to leave the system to friendly devices that are allowed to receive the security class. In an embodiment, an additional layer requiring that the machine have access rights is further implemented. This additional layer requires machines to belong to friendly domains, for each machine to have permissions for code and data classes they can store, and excludes unfriendly machines (e.g., servers) to access or receive data or code from the system (e.g., the SoC).

Seventhly, in an embodiment, data and code are encrypted in storage, each security class with a different key. As a result, if the class-storage block mapping is corrupted, the data cannot be accessed and compromising the integrity of the system is made significantly more difficult even if possible.

Eighthly, in an embodiment, rules of interaction for code pages are used to create secure enclaves. The secure enclaves allow only specific code to access specific data (thereby preventing data corruption and secrets theft). The rules for code-code interaction also prevent return-oriented programming (ROP) and the rules for code-data interaction prevent, at least some kinds of, side channel attacks.

Ninthly, according to an embodiment a dynamic parameter tracks per flow (thread) its security context, i.e., the "minimum" security class of the data in the flow that's determined by the security classes of the data in the conditions that determine the dynamic program flow (jumps and conditional jumps). This parameter is stored and restored on subroutine calls and context switches. Since it cannot be saved by software (e.g., the operating system), the processing unit saves it, as well as the security class of the data in the registers, the security flags, as discussed herein, and the register content. Adding the program counter to the saved list, means that the return parameters are not on the stack, hence stack overflow attacks become moot due to being ineffective.

Tenthly, in an embodiment, a TEE is used for configurations, context switching and secure communications.

Eleventhly, in an embodiment, each machine has a list of classes it is entitled to, i.e., can store, thereby enabling a machine to decline or not allow entrance, to classes it is not entitled to. This can prevent worms and malware from jumping from one machine to another.

Twelfthly, in an embodiment, a memory controller (MC) tracks the security class of each memory page. The MC is responsible to enforce the access rules on reads and writes. The MC is also responsible to shred the page content when the page is freed. This can be done immediately by writing 0s to the page, or during the next refresh cycle of the page. While waiting for the next refresh cycle, all reads and writes are blocked in the interim.

Thirteenthly, in an embodiment, when packaging code, a mapping of each code and data section is added to a class, and the interaction rules between classes. The rules are only between the classes of the program.

Fourteenthly, in an embodiment, only the enterprise IT can add rules between classes of different programs and classes of the organization. Fifteenthly, when downloading code from a vendor, a machine maps a tuple (vendor, vendor GUID) to an internal GUID. Thus, GUIDs of downloaded programs are different on each machine.

Sixteenthly, in an embodiment, when downloading code from an IT repository, the machine keeps the GUIDs of the code and data sections. If an IT GUID clashes with an internal GUID from a program downloaded from a vendor site, the machine changes the internal GUID to remove the clash.

One of ordinary skill in the art should readily appreciate that following multiple data types, multiple code types, controlling security class interactions on a machine, and controlling data traffic between devices allow for improving storage and enabling storing in new locations that were not useable by certain existing solutions. In particular, the protection according to the disclosed embodiments is based on the content type rather than on data or code location. Thus, any content (data or code) can be stored anywhere since its respective protection (security class) is attached to it as is explained herein in greater detail.

According to one aspect of the invention there exists a mapping between data memory blocks and data security classes. By mapping the memory block to the security class of the data in the block, the security class of the data can be preserved. That is, every memory block is mapped according to the security class of the data stored in the block. For example, but not by way of limitation, if the system has two security classes, personal and business, then every (data) block is mapped as either personal or business; if the system has four security classes (personal, digital right management (DRM) data, business classified and business secret), then every memory block is mapped to one of the four security classes. In an embodiment, the personal security class may essentially mean "not classified, can go anywhere". One of ordinary skill in the art will therefore readily appreciate that the mapping of memory blocks according to this principle, can therefore be agnostic with respect to what the data is (content), what virtual machine it belongs to or what process it belongs to. Rather, in various embodiments, the mechanism is orthogonal to all other mapping usages and is performed based on the security classification of the content itself.

In one embodiment the size of a memory block is 4 kilobytes (KB). In this regard, it is noted that 4 KB is the size of a memory page commonly used in double data rate (DDR) memories. It has been identified, therefore, that 4 KB memory block size provides improved performance as compared to at least some other memory block sizes. It should be noted that various disclosed embodiments are described with respect to a security class associated with a memory page of 4 KB but, without loss of generality, any size between 4 KB and the size of a cache line can be used in accordance with at least some disclosed embodiments.

In various implementations, more than one data class may be written into a memory block of this size. As a result, it is necessary to resolve what happens when data classified as security class A is written to a block classified as security class B. According to various disclosed embodiments, this is handled by an $n \times n$ matrix that defines the resulting security class when a security class i and security class j are mixed in a given memory block. In an embodiment, the matrix is symmetric $((i,j)=(j,i))$, such that the representation can be the elements above or below the diagonal. Since the matrix is sparse, any efficient representation of sparse matrices is further useful in accordance with such embodiment. Therefore, a memory page refers herein to the smallest size of memory that is assigned a security class.

The classification rules matrix is typically programmed by a Trusted Execution Environment (TEE). The TEE receives the matrix values from a server directly, i.e., not via an operating system (OS), as described further herein. In an embodiment, the default classification is a predetermined value associated with incompatibility of security classes. As a non-limiting example, the default classification is −1, which means that the security classes are incompatible.

In a further embodiment, when two security classes are incompatible, they cannot be written into the same memory block (or used in the same instruction). Any such attempt results in the data not being written and a hardware exception. A non-limiting example of incompatible classes is DRM data (e.g., a copyrighted video) and business data. Trying to write one type of data in a memory block classified with the other type shall result in a hardware exception. It should be noted that, while usually entry (i,j) is either i or j, this is not required according to at least some embodiments.

The owner of the matrix can place any value which provides the necessary flexibility and other advantages of the disclosed embodiments.

Reference is now made to FIG. 1 that depicts an example schematic block diagram of a system 100 for determining a security class of a memory block when writing to the memory block according to an embodiment. The security class of the memory block is a function of the security class 120 of the data, and the security class (not depicted) of the memory block, as stored in the memory controller security class cache, 130, in the memory controller (and in case of a cache miss, is fetched into the cache). The two classes are used as input to the data-data security class matrix 140, and the output of the matrix is the security class of the memory block after writing the data. The class of the memory block is updated in the cache. If the classes are incompatible, the data is not written to memory, the class is not updated and an exception is generated. In an embodiment security class matrix 140 may be a collection of registers or a memory.

In an embodiment, in order to accelerate the class checking process, the memory block to security class mapping can be cached, for example into the memory controller security class cache 130 by the memory controller 110. By virtue of the localization principle, once a memory block security class is cached, upcoming reads/writes will come from the same, or neighboring, memory blocks, hence will also be pre-fetched and typically reside in the cache. If the mapping is done in page order, then assuming the size of a cache line is 64 bytes and the class requires 32 bits, a cache line holds the classification of 16 consecutive 4 KB memory blocks. The cache can be write-back, since the only way to lose the mapping is a memory failure that wipes all memory content, rendering the mapping irrelevant. The memory controller 110 is further responsible for the shredding, i.e., writing over confidential content, of memory blocks that have been freed from use and that may be recycled. Once the content of the memory block is shredded its corresponding security class is set to non-confidential. During this process the hardware is adapted to prevent any access of any kind, other than the shredding process, to such a memory block.

Figure 2:
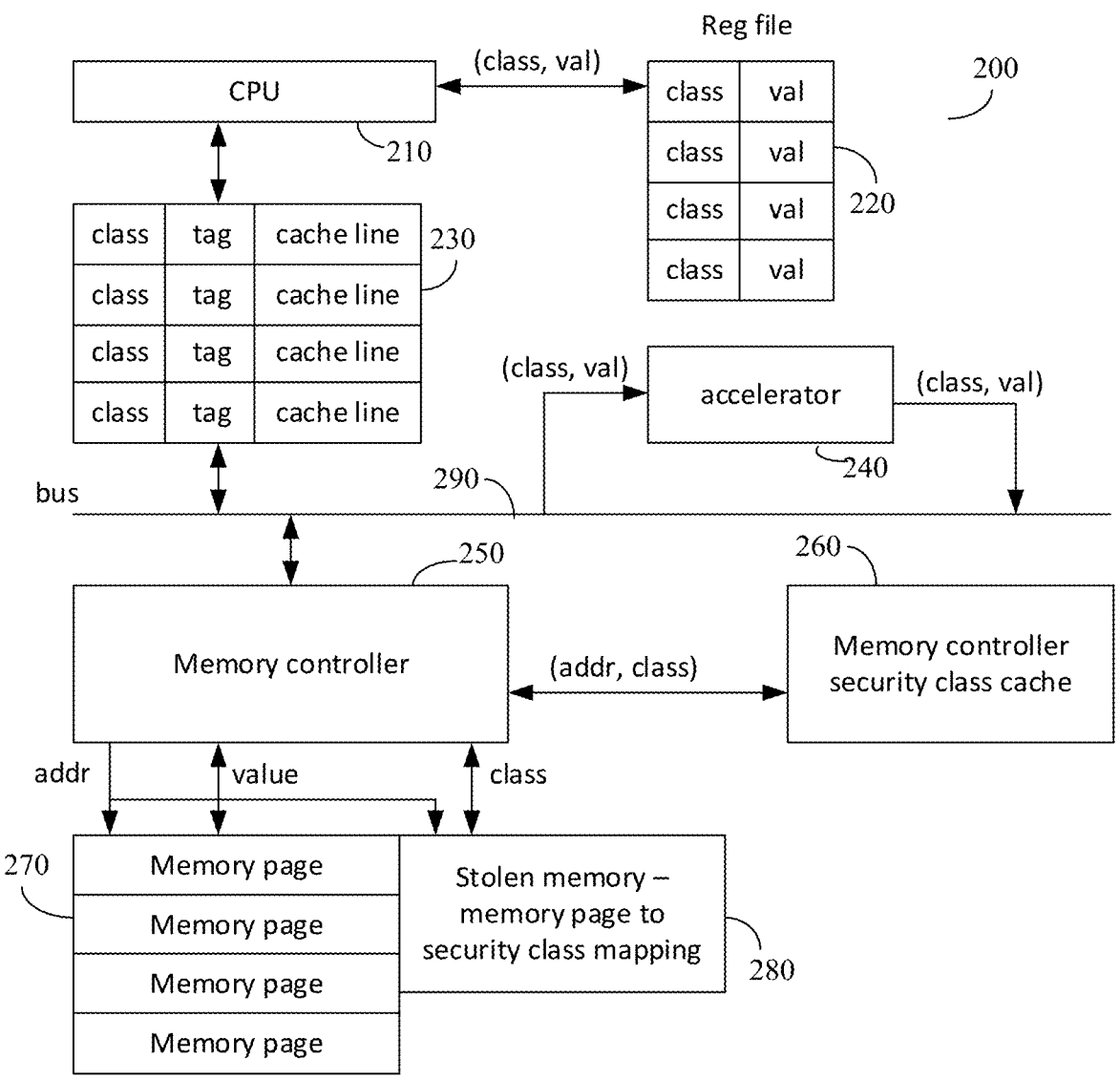
FIG. 2 is a schematic block diagram of the system and data moving therein with its security class.

Reference is made to FIG. 2 that shows an example block diagram 200 of a system and data moving therein with its security class according to an embodiment. When data is read from memory, the memory controller 250 also handles the security class of that data. The security class, according to an embodiment, must accompany the data to its destination, the cache hierarchy 230 or an accelerator 240. From the cache 230, the data moves to the CPU 210 and register file 220. From the register file 220 it can move to the CPU 210, back to the cache 230 and then to a memory (not shown) or to an accelerator 240. In an embodiment of a semiconductor chip, the data may reach an on-chip buffer (not shown) or a register of the SoC (not shown). From an accelerator 240 the data may be moved back to memory, to an on-chip buffer or to an on-chip register. The memory controller security class cache 260 may function as explained in FIG. 1 for memory controller security class cache 130.

A bus 290 is composed of data lines and control lines. According to an embodiment, security class lines are added to the control lines of the bus. One of ordinary skill in the art would readily realize that there may be different implementation for the bus 290 depending on the bus syntax and semantics. For example, the bus 290 can specify the start address and number of words, or the start and end address or just an address per word. Regardless of the scheme that is used, the security class of the data written to the bus is added as part of the transaction that occurs over the bus 290 and, in an embodiment, is inseparable therefrom. According to an embodiment, a transaction involving multiple security classes is broken into transactions per class. According to an embodiment the bus 290 may support preemption to deal with the resulting changes in the security class of each transaction. If the bus 290 is implemented as network on a chip (NoC), then the security class may be added to the packet syntax, along with the address and length.

According to an embodiment, each cache line in cache 230 has an associated tag to indicate its address. The tag may be control metadata. The security class is another type of metadata, hence is added to the tags as shown with respect to the cache 230. When data arrives at the cache 230 via the bus 290, the security class is read and recorded in addition to the data and address. As data moves up and down the cache hierarchy, the security class moves along with it (as does the address). Any snooping/coherency mechanism that reads data from the cache 230, must also read the security class. When cache data is written back, the data, address and security class are placed on the bus 290. The address can be a true memory address, or memory mapped input/output (IO), or on chip buffers.

The central processing unit (CPU) 210 is a pipeline, where each stage has control registers (not shown) and data registers (not shown). The stages of the pipeline can be divided into instruction fetch stages, processing stages and write-back stages. For simplicity, a load-store architecture is assumed herein, i.e., data cache content is loaded into the registers and instructions receive their operands from the registers (except for constants, immediate values, etc.). In parallel to the processing stages, new circuitry using the data-data security class matrix and the code-data security class matrix, described herein with greater detail, determines the security class of the result.

For load instructions, eventually the data is fetched from the cache 230 with its security class and moves to the write-back stage with the accompanying security class. For store instructions, the data is read from a register of the register file 220, accompanied by its security class and is stored in the cache 230 along with its security class, or placed on the bus 290, on its way to its destination, with the security class. For operations on data, consider the exemplary and non-limiting instruction A=B op C, where B and C are operands, "op" is the operation and A is the result. B and C enter the operation with a security class. The class of A, the result, is determined based on the data-data security class matrix and the code-data (described later) security matrix. If the classes of B and C are incompatible, or the security class of the instruction is incompatible with the resulting class of A and B, the operation generates, according to an embodiment, a hardware exception. Certain operations result in constant values (e.g., XOR(a,a)==0). These operations, which are sometimes used to reset register values, are recognized and reset the security class of the result to non-secure.

It has been identified that conditional execution requires special care. In existing CPUs, arithmetic operations set the values of the arithmetic flags. The arithmetic flags are checked during an execution of a conditional statement. If the flags fit the condition, the execution flow goes one way. If the flags do not fit the condition, the execution flow goes another way. The security issue with conditional statements is that the execution is a result of data values, hence the value of the data may be derived from the execution flow.

Thus, in addition to the arithmetic flags, and according to an embodiment, the CPU 210 sets an arithmetic security class which is the security class of the result of the arithmetic operation. When the program flow reaches a conditional branch statement, the arithmetic security class, the security class of the branch/jump address and the existing flow security class determine a flow security class of the execution going forward. The flow security class is checked with the data security class and code security class of every instruction during the execution of the program going forward.

Figure 3:
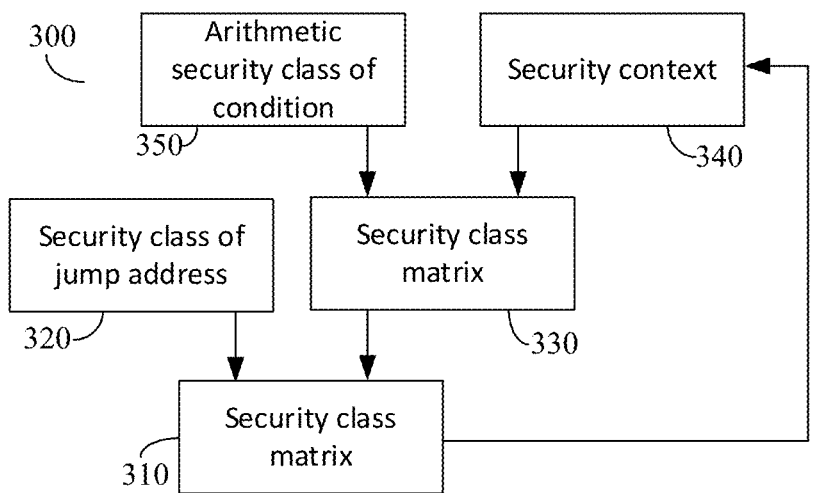
FIG. 3 is a flow-diagram of the calculation of the security context according to an embodiment.

FIG. 3 shows an example flow-diagram 300 of the calculation of the flow security class according to an embodiment. It should be noted that if the jump is unconditional, only the jump address (if it is a result of a calculation, i.e., data dependent, not a constant) is used to update the flow security class. In an embodiment, the first security class matrix 310 may be a register, a collection of registers (making up a "cache" of the most recently used data pairs from the full matrix) or memory containing a partial or full security class matrix therein. The security class of jump address 320 is, in an embodiment, a register. In an embodiment, the second security class matrix 330 may be a register, a collection of registers or memory containing a security class matrix therein. In an embodiment, the flow security class may be provided from a security context register 340 and the arithmetic security class of the condition may also be a register.

According to an embodiment, every program starts its execution with the security context in the non-classified class. Every arithmetic operation sets the arithmetic security class. The value of the arithmetic security class is set whenever the values of the arithmetic flags are set and the scope of the arithmetic security class is the same as the scope of the arithmetic flags (i.e., if they are reset then so is the arithmetic security class). Whenever a branch operation occurs (jump, conditional jump, call subroutine) the security context is updated based on its current value, the arithmetic security class and the security class of the branch address, shown for example in FIG. 3, the lone operand in the instruction. The security class of a label, which are in fact constants, do not affect the flow security class. Jumps to computed addresses can.

Figure 4:
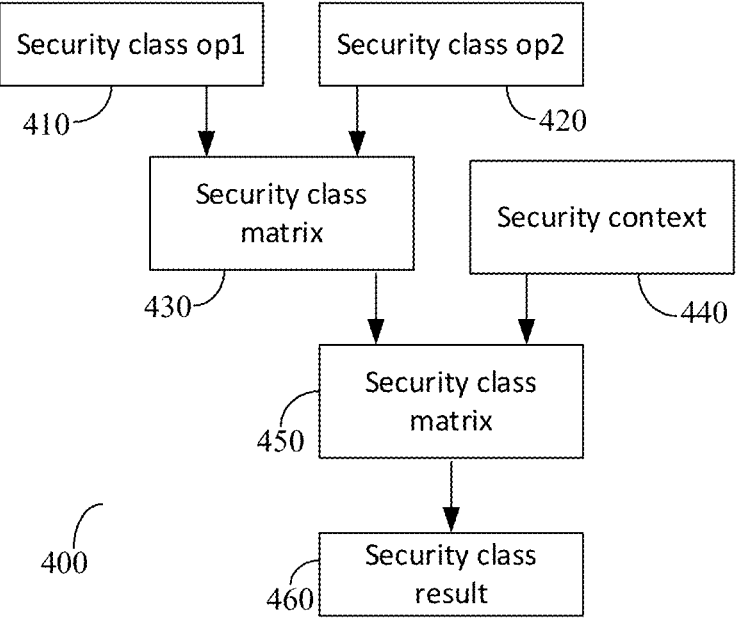
FIG. 4 is a flow-diagram of the calculation of the security class of an operation according to an embodiment.

Reference is now made to FIG. 4 that describes an example flow-diagram 400 of the (data dependent part of the) calculation of the security class of an operation according to an embodiment. Accordingly, the calculation of the security class of an operation is enhanced to include the security context in addition to the security classes of the operands. As shown in FIG. 4, the security class of operand 1 (op1) 410, is input into the data-data security class matrix 430, along with the security class of operand 2 (op2) 420.

The resulting class output by the security class matrix 430 is input into the data-data security class matrix 450, along with the security context 440. The result is the security class result 460 of the mixed data. For example, if op1 security class is '1' and op2 security class is '2' then the combined class for the result is to be consulted with the security matrix and may be found to be '3', that is the content pointed to within the relevant security matrix, for example, data-data security matrix. If the security context is '3' the data-to-data matrix is checked again to determine which security class results with the inputs '3' and '3', and it may be '3'. Therefore, the result of this example operation will be '3'. It should be appreciated that the values '1', '2' and '3' are arbitrary values for the purpose of the example and others values may be used without departing from the scope of the invention.

It should be noted that a subroutine is an execution context. It may have its own conditional statements hence inside the subroutine the security context may be elevated. When returning from the subroutine it is desirable to return to the security class that was in effect when the subroutine call was made. Therefore, the CPU 210 keeps track of the depth of the subroutine calls (increase the depth on call, decrease on return), and for each call, it keeps the security context at the time of the call. In an embodiment, the security context of an embedded subroutine call is never lower than the security context of the subroutine from which it was called. This is so since the condition for the subroutine call can only elevate the minimum execution security class. The subroutine depth and the security classes are part of the thread context that needs to be stored securely when thread contexts are switched, as discussed furthermore herein.

When the security context is stored securely as described herein, as well as the security class for the registers and the security flags, then the register data and the program counter are removed from the stack when these parameters have been securely stored. As a result, a stack overflow attack, i.e., overwriting the return address, is made moot.

In the case of an "if-then" statement, one of two possible execution flows may occur. The first execution flow occurs when the condition is met, i.e., considered to be logically true and the second execution flow occurs when the condition is not met, i.e., considered to be logically false. Conditional branches elevate the security context until the end of the program or subroutine. To better limit the effect of the condition, the execution flow is statically analyzed in order to determine the boundaries of the conditional code. Thus, when the conditional code is exited, a switch back to the previous security context occurs. By doing so, the higher than necessary classification of data is limited or otherwise eliminated. It should be noted that additional instructions are used to save and restore the security context and to recognize the end of the conditional code. In the case of a subroutine, the "return" instruction indicates the end of the scope of the flow security class which was set within the subroutine.

Returning to FIG. 2, when the CPU 210 writes a value into the register (reg) file 220, the register receives the security class of the data written into it. When the CPU 210 reads data from the register file 220, it also reads the security class of the data. The security class is written to the security class registers 410 and 420 associated with the security class of the data. Furthermore, when data is evicted from the cache 230 and written back to memory 270, it is placed on the interconnect with its security class, provided stolen memory 280 where memory page to security class is mapped, on its way to the memory controller.

The accelerator 240 provides certain processing acceleration that may be performed under the control of the CPU 210. In this context, an accelerator 240 may be a hardware function receiving data and configuration information as inputs. In an embodiment, the accelerator can have a CPU for control functions, but does not carry out any data processing, rather, that is performed on the accelerator 240. That is to say that, in an embodiment, an accelerator is a hardware only block or a hardware block with fixed, authenticatable firmware, that which once loaded is immutable and used mainly for control tasks. Non-limiting examples of such accelerators include, but are not limited to, cryptographic engines, direct memory access controllers (DMAC), JPEG accelerators, MPEG accelerators, network interfaces and more.

The results of the accelerator 240 processing are the output of the accelerator 240. The configuration parameters of the accelerator 240 are used to determine the actual processing performed by the accelerator 240. Specifically, the configuration parameters can be used to determine the execution paths within the accelerator 240, and can further be used to determine computational parameters such as filter coefficients.

Figure 5A:
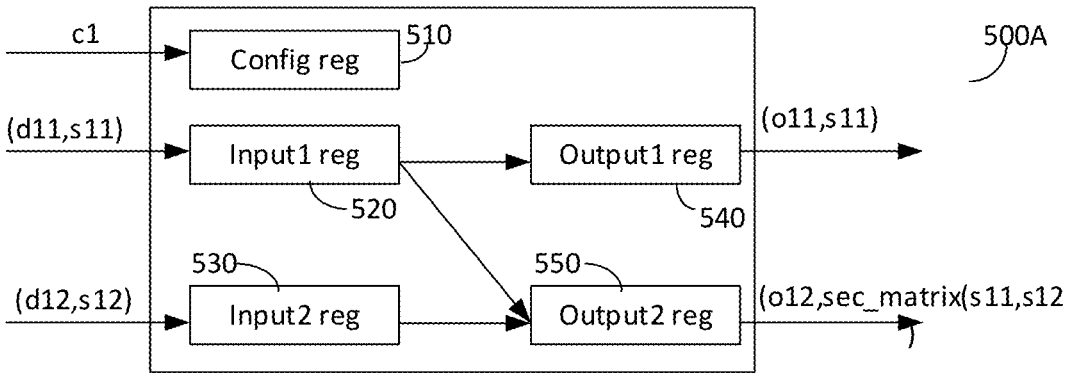
FIG. 5A is a block diagram of an accelerator having a first configuration according to an embodiment.
Figure 5B:
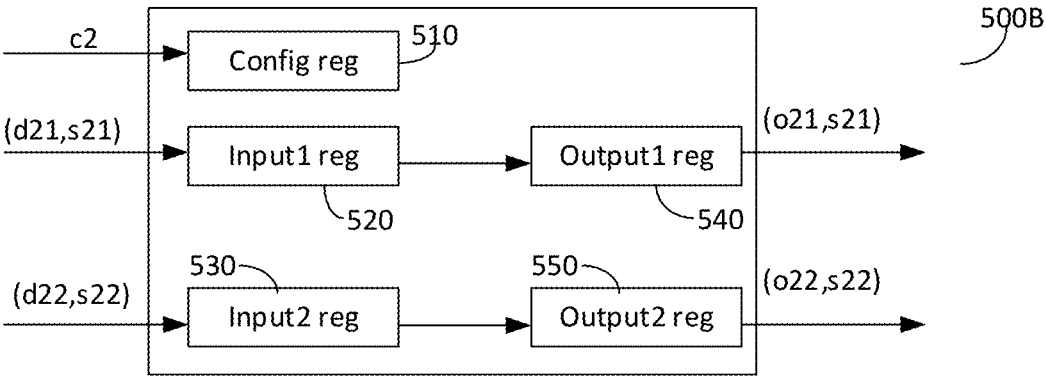
FIG. 5B is a block diagram of an accelerator having a second configuration according to an embodiment.

Reference is now made to FIGS. 5A and 5B that show example block diagrams 500A and 500B respectively of an accelerator 240 having a first configuration and a second configuration respectively according to various disclosed embodiments. By knowing the configuration parameters fed to the accelerator 240, their security class, and the security class of the data (lone data entry or multiple entries from different sources), it can be determined which input affects which output, hence the security class of the output, without following the data inside the accelerator 240.

When the accelerator is configured as shown in FIG. 5A under the control of configuration register 510, the input configuration register 510 configures the accelerator such that a first input register 520 provides data to both a first output register 540 and a second output register 550. While a direct connection is shown in FIG. 5A for example purposes, it should be noted that an indirect connection may be equally utilized with data processing happening between the input register and the output register in accordance with the disclosed embodiments.

Similarly, a second input register 530 is configured to provide data, directly or indirectly, to the second output register 550. Assuming that the first input register 520 receives data d11 and security class s11, and the second input register receives input data d12 and security class s12, the respective outputs and their security classes are determined. The first output register 540 that receives data only from the first input register 520 outputs a result o11 that inherits the same security class of its input, namely s11. The second output register 550 receives data from two sources, the first input register 520 and the second register 530 and hence the resultant security class will be impacted from the security classes of both s11 and s12.

As can be seen in FIG. 5A, the output of the second output register 550 o12 has a security class that is computed based on s11 and s12, and as further explained herein with respect to the operation of the security class matrix. The case shown in FIG. 5B has a different configuration of the accelerator 240 by different programming of the configuration register 510. As a result, the first input register 520 provides its data, directly or indirectly, only to the first output register 540. Similarly, the second input register 530 provides its data, directly or indirectly, only to the second output register 550. Therefore, the respective outputs of both registers 540 and 550 providing outputs o21 and o22 respectively, each inherit the security class s21 and s22 of their respective input registers 520 or 530. For an accelerator that processes one class at a time, the interconnect can store the data class at the input and apply it to the output. This, in turn, can save logic in the accelerator, thereby reducing the amount of memory needed to store instructions encoding such logic.

It should be noted that there are at least first and second modes of working with a pipelined accelerator, which in an embodiment may be a heavily pipelined accelerator. The first, alluded to above, configures the accelerator 240, pushes data through the accelerator 240, waits for all the data to exit and only then starts another iteration, that in an embodiment may include, but in not limited to, change of configuration, push data, etc. The second is to configure the accelerator 240 to push data through the accelerator 240 and once all the data clears the first stage of the pipe (not shown) of the accelerator 240, to reconfigure and start pushing new data.

In the second mode, there may be a plurality of data types and configurations, hence as data and configuration keeps progressing through the accelerator 240, the security class of the output may change at a time tick where the new configuration and data begins to exit the accelerator 240. To accommodate multiple configurations in the pipeline of accelerator 240, the pre-calculated security class of the new output must flow with the initial wave of new data through the pipe. This can also accommodate different outputs that result from paths of different lengths.

It should be noted that, even when the security class flows in the pipe, it does not flow with the data and is not calculated at every processing junction. Rather, the security class moves like control data from one stage to the next, until it is used. The accelerators depicted in FIGS. 5A and 5B are combinational logic and do not include a processing element such as a CPU (except for control). Accordingly, the case for a "subsystem accelerator", is dealt with as an SoC, i.e., the CPUs, interconnect, buffers, queues and all other elements behave as described herein. External SoCs which act as offload engines, e.g., GPUs, machine learning engines, and other like computational engines, are described further herein.

When data moves from one processing unit of the SoC to another processing unit of the SoC, it may move through external memory, or, to save time and power, it can move on-chip. In an embodiment, moving data on-chip includes storing the data on chip. This is done in either queues (not shown) when the handoff from one unit to the next is fast since such queues can be short. Queues may be embodied without departing from the scope of the invention and be connected to the producer on the input side and/or consumer on the output side, or one side to the producer/consumer, e.g., an accelerator or a memory, and the other to the interconnect 290. Data can be further moved on-chip using, typically, large buffers (not shown), when the handoff is slower. Buffers are typically connected on one side to the interconnect 290 and on the other to a producer/consumer, e.g., an accelerator or a memory.

For queues, the security class can be appended to the data as it moves through the queue. Buffers, that are typically significantly larger memory wise than queues, can be partitioned into smaller units where each unit receives data of the same security class, hence a single common security class type is needed for the unit. In an embodiment, the hardware buffer control is configured to identify when a unit is emptied, i.e., all consumers have read the data, so it can shred the memory, e.g., reset the content to 0 and further reset the security class to minimal, e.g., to 0.

It should be noted that a cache may follow this prescription. The cache is divided into smaller units, e.g., cache lines and ways, and since each cache line comes from the same memory block, all the words of the line have the same security class, hence the security class is added as a cache line metadata. A cache line is only emptied when it is overwritten, or invalidated, hence shredding happens naturally and does not require additional processes. According to an embodiment, a mechanism that invalidates a cache line, or shreds it, is provided when the source memory page of its data is shredded.

Figure 6:
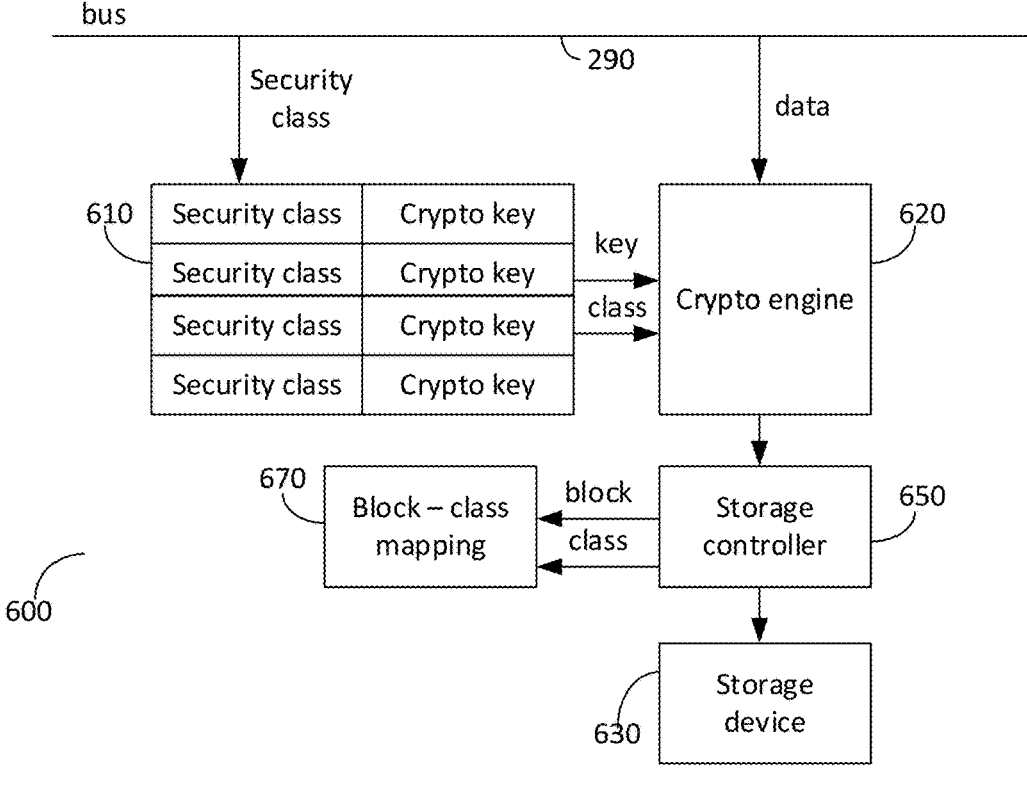
FIG. 6 is a block diagram of encryption of a security class when written into storage according to an embodiment.
Figure 7:
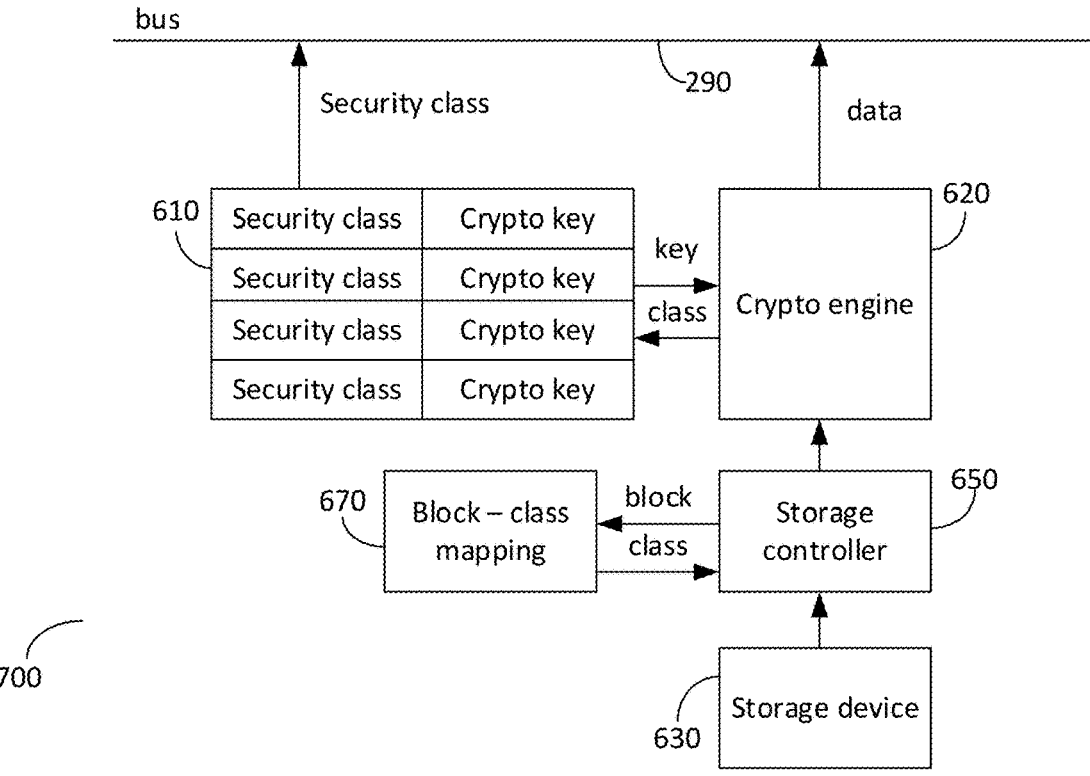
FIG. 7 is a block diagram of encryption of a security class when reading from storage according to an embodiment.

Reference is now made to FIG. 6 that depicts an example block diagram 600 of encryption of a security class when written into storage according to an embodiment and FIG. 7 that shows an example block diagram 700 of decryption of a security class when reading from storage according to an embodiment. In an embodiment, data may need to be stored in nonvolatile memory and retrieved therefrom using the storage controller 650. The storage controller 650 receives data from the interconnect 290 and writes to the storage device 630. Data is retrieved from the storage device 630 and written to the interconnect 290 on its way to a desired destination. In the first case, the security class arrives with the data on the interconnect 290. To secure the data on the storage device 630, which includes but is not limited to detachable memory devices such as magnetic disk, SSD or disk-on-key, data is encrypted using crypto engine 620 before it is written into the storage device 630.

Every security class uses a different key which serves at least two purposes. The first purpose is defense in depth, i.e., if one key is broken, the others remain intact. The second purpose is to prevent an adversary from changing the class mapping of memory blocks. When an adversary wishes to steal content from a protected device an attack on the security class map may be attempted. The aim would be to change all the security classes to a non-protected class. In such a case, using the teachings herein, when the data is read from a protected device according to an embodiment, it will not be decrypted, or will be decrypted with the wrong key, hence the attack is rendered worthless for data stealing. It should be noted that the treatment of data and/or code within the SoC and off of the SoC, the latter referred to as storage, is consistent with respect of the security classes thereof.

The storage controller 650 uses storage blocks of the storage device 630 in order to map security classes to memory blocks. This map is read by the storage controller 650 and written to (secure, stolen) memory 280 for fast fetch when storage blocks are read from the storage device 630. In an embodiment there is on the disk (e.g., a hard-disk drive (HDD) or solid-state drive (SSD)) a mapping of blocks to security classes, just like there is a linking of blocks in the file system. The storage controller 650 reads the mapping into a cache it controls, block 670. The map in cache/memory is updated every time a storage block is written to the device, using the class matrix with the class of the new data and the class of the memory block as explained herein in more detail herein.

It should be noted that storage blocks have an atomic unit. That is a unit size that no smaller of can be read or written. Thus, as long as memory blocks and storage blocks are the same size, there is no need for the class matrix. Only when storage blocks are larger than memory blocks, and more than one memory block can be written to the same storage block, is it necessary to involve the operation of a security matrix according to the principles described herein. Alternatively, a storage block can be subdivided into subblocks the size of a memory block, and in this case, every time a memory block is written to storage, the corresponding subblock inherits its security class.

In an embodiment it is assumed, without loss of generality, that the memory (sub) page size, e.g., 4 KB or a fraction thereof, that receives a classification and the storage (sub) block size the receive a classification are the same size. The classified size written to storage as the "storage block", whether it is the true size of the block or a fraction equal to the size of the classified memory block. The mapping is updated/copied to the storage device 630 at regular intervals, for example according to the intervals in which the file system of the operating system (OS) updates the file map on the device. The OS is responsible to map files to storage blocks. For each file, the OS keeps a linked list of storage blocks that make up the file, in the correct order, which is the file map. When blocks are "freed" by the file system, the OS notifies the storage controller 650, so that the storage block can be reclassified as unclassified. In an embodiment there is no need to shred the data, since the data is encrypted. In some implementations, the data of a freed block may be shredded.

Reference is now made to FIG. 7 that is an example block diagram 700 of encryption of a security class when reading from storage according to an embodiment. An artisan would readily appreciate that the schemes described in FIGS. 6 and 7 fit naturally with virtual memory schemes, as storing memory pages in secondary storage and fetching pages from secondary storage preserves the security class. Furthermore, there are also no constraints as to where the fetched page can be placed in memory under control of memory controller 250.

According to an embodiment there is an underlying assumption that data is always written in storage block size, hence when new data is written to a storage block, the controller changes the security class of the block. If the writing were to stop for some reason before the full block is written, some of the old data is still present in the block, encrypted with its key, and the new data is encrypted with its key. While the old, secure, data will not be decrypted correctly, it can be shipped anywhere, and perhaps decrypted with nation state resources. The same scenario can happen if we update the security class after the full block is written. This time the attacker writes confidential data onto a non-confidential block. While the confidential data is encrypted, the block can be shipped anywhere. To prevent such manipulation, the storage controller can buffer a block (or mapped subblock) before beginning the write. Only when all the data is fully buffered, the write begins. The only way to stop the write is to stop power. Another possibility is the update before write when writing confidential data and after write when writing non confidential data. In terms of viability of the attack, if the OS file system code is the only code that can program the storage controller, and the file system always writes in storage block sizes, there is an extra line of defense in addition to the storage controller block buffer. It should be further noted that the term "storage controller" is used herein for the interface of the SoC with the storage device. In an embodiment it may be that the "storage controller" is on the device and the interface is PCIe, USB or a like interface. Thus, "storage controller" in an embodiment is the SoC interface that communicates with the storage device.

According to an embodiment, the encryption keys set for each security class may make use of the same keys per organization class on all devices of an organization. In another embodiment each device generates a different key set. Using global keys ensures that one can pass a detachable memory device from one machine to another and the new machine can access the data. It also ensures that if device keys are for some reason corrupted it is possible to restore them. The advantage of using different keys on each device means files on detachable devices written by one machine cannot be read by another, and keys broken on one machine cannot be used on another. It will be more difficult to restore security keys. However, if the files are backed up, then they can be downloaded to the device, as in any disk corruption use case.

According to an embodiment a TEE is responsible for creating the security class encryption keys and for configuring the security class key mapping. The security class key table can only be written to by the TEE and can only be read by the storage controller. The full key table that maps security classes to keys is stored in storage and belongs to the TEE. A table, 610, is on chip and stores the keys of the classes that are currently active, i.e., in use by the SoC.

According to an embodiment this allows for the reduction from the range of 20-bits per class in storage to some 10-12 bits on chip, as not all security classes are in use simultaneously at any time.

In various embodiments, the security class of data inside a device is tracked to prevent data corruption by rogue code and so that the data may be transferred only to approved devices and not to unapproved, and therefore potentially malicious, devices. This can be achieved by employing several techniques according to various disclosed embodiments. Every device receives an identity and is known by the organization's identity system. In a sense, a device may be perceived as a user of sorts, making it uniquely identifiable.

As part of the configuration process every device receives from, for example but not by way of limitation, an identity management system (not shown), an encrypted token, or identification provided by the identity system, which is verifiable using the organization's public key. This allows: a) ensuring that the device belongs to the organization; b) specifying the security classes the device can protect; and, c) providing the latest TEE software versions on the device. It should be noted that the reasons the organization's identity system is used are: a) to be able to use cross organizational federated systems that extend the identity system of the organization; and, b) to enable the server to identify the device it is serving to, to enable peer-to-peer data connections and to reuse existing infrastructure and not reinvent the wheel.

According to an embodiment, interfaces are used as enforcers. That is, the interfaces block outgoing data until a TEE verifies the credentials of the data destination. If the destination is not approved, the data does not exit the system. Furthermore, interfaces receive the security class of incoming data and propagate the class to the SoC. It should be realized that the system includes the SoC, external DDR memory, storage device, etc.

Figure 8:
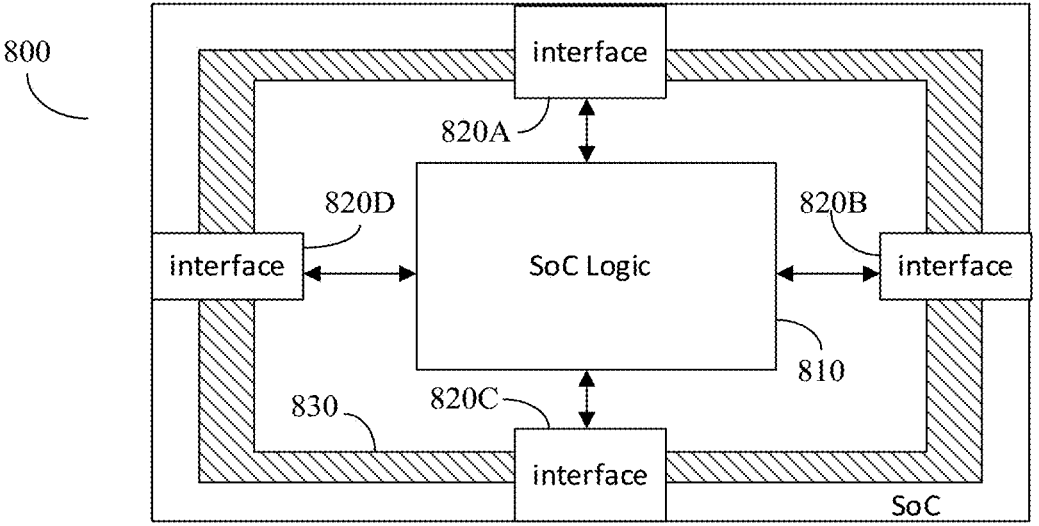
FIG. 8 is a block diagram of a system on chip comprising interfaces that provide a security moat around the SoC logic according to an embodiment.

Reference is now made to FIG. 8 that shows an example block diagram of a system on chip (SoC) 800 comprising interfaces 820A-D that provide a security moat 830 around the SoC logic 810 according to an embodiment. In an embodiment, the enforcers at the interfaces are the first to handle incoming data, hence such interfaces can receive and securely retrieve the incoming security class. No malware can affect this security process, since the CPU, which is part of the SoC, has not seen the data yet and the data is not in memory (e.g., DDR) where it can be accessed. Interfaces 820, for example but not by way of limitations, interface 820A, 820B, 820C and 820D, are the first to handle incoming data and the last to handle outgoing data. Therefore, the interfaces 820 can securely attach an outgoing security class to outgoing data. Malware may attempt to obtain data from the SoC 800 by acting within the SoC logic 810. However, as would be readily appreciated by an artisan, the malware cannot affect the actions of the interface 820.

Figure 9:
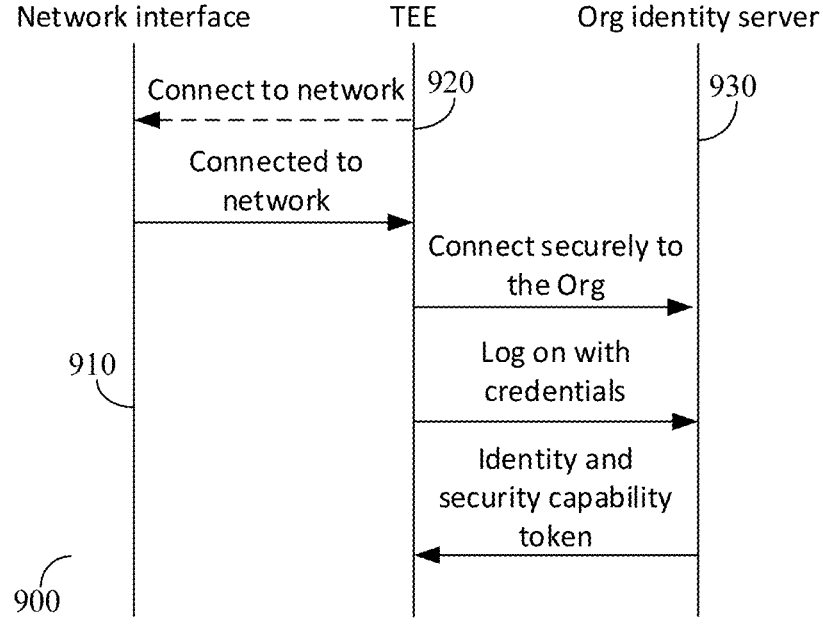
FIG. 9 is a communication diagram depicting a trusted execution environment (TEE) receiving a security token to attest to its identity and security capability from a qualified server according to an embodiment.

FIG. 9 is example communication diagram 900 depicting a trusted execution environment (TEE) 920 receiving a security token to attest to its identity and security capability from a qualified server 930 according to an embodiment. Every device has a hard-coded identity such as a global unique identifier (GUID) burnt into fuses, either by the organization, original equipment manufacturer (OEM) or chip manufacturer. The GUID can also be generated by the TEE 920 and written to on-chip, non-volatile memory, accessible only to the TEE 920. In an embodiment, an initial password for the device is provided by personnel of an organization. On the device, a TEE 920 receives the initial password as part of the initial configuration of the device.

The TEE 920 also receives the organization's public key and the internet protocol (IP) address (or name) of the identity server 930. Once the TEE 920 is configured, it can connect to the organization network and request a token attesting to its identity and security capability.

The device interfaces 910 shall signal the TEE 920 that the device is connected to a network. Alternatively, the TEE can request the network interface 910 to try to connect to the sensed network. The TEE 920 shall establish a secure connection, typically by standard means that are known in the art, to the organization's identity server 930 and present its credentials, i.e., its GUID and password. The identity server 930 provides the device with the token attesting to its identity, software version and security capability, and any other information deemed necessary. The token is encrypted using the organization's private key and has an expiration date and time. In an embodiment, before ending the session, the TEE 920 changes its password with the identity server 930. The tokens can be valid for a short period of time, requiring the device to request a new token with a new expiration time, whenever it needs to provide the token to another device. This can reduce the replay-ability of the token. To further reduce replay-ability, each side can send the other a nonce word, and the receiver must provide the sender a token that includes the nonce word. In general, various existing methods to reduce replay of security tokens may be utilized in accordance with the disclosed embodiments.

Using tokens provides as described herein several advantages. First, for conveying to the client the server's security capabilities. A standard certificate provides only assurances that the server is who it claims to be, while the disclosed tokens also provide information about such security capabilities. Second, to assure the server of the client's identity and security capabilities as existing solutions do not identify the client to the server. Thirdly, when connecting to a peer, neither side can sign a message with the organization's private key, hence each device requests a short-lived token from the identity server 930 to provide to the other side. In general, the tokens are a means for mutual attestation. Any other method that includes the security classes a device is allowed to receive is also acceptable. Note that the token can also hold the identity of the user assigned to the device. If the user using the device is not the user assigned to the device, the identity server 930 can, depending on a policy, refuse to serve the data even though the device is authorized, and the user is authorized. In an embodiment a poison pill message may be sent to a device in order to destroy cryptographic keys so that data on the device cannot be opened. As the TEE in the system controls all cryptographic and security information, it should also be adapted to receive a poison pill message.

Figure 10:
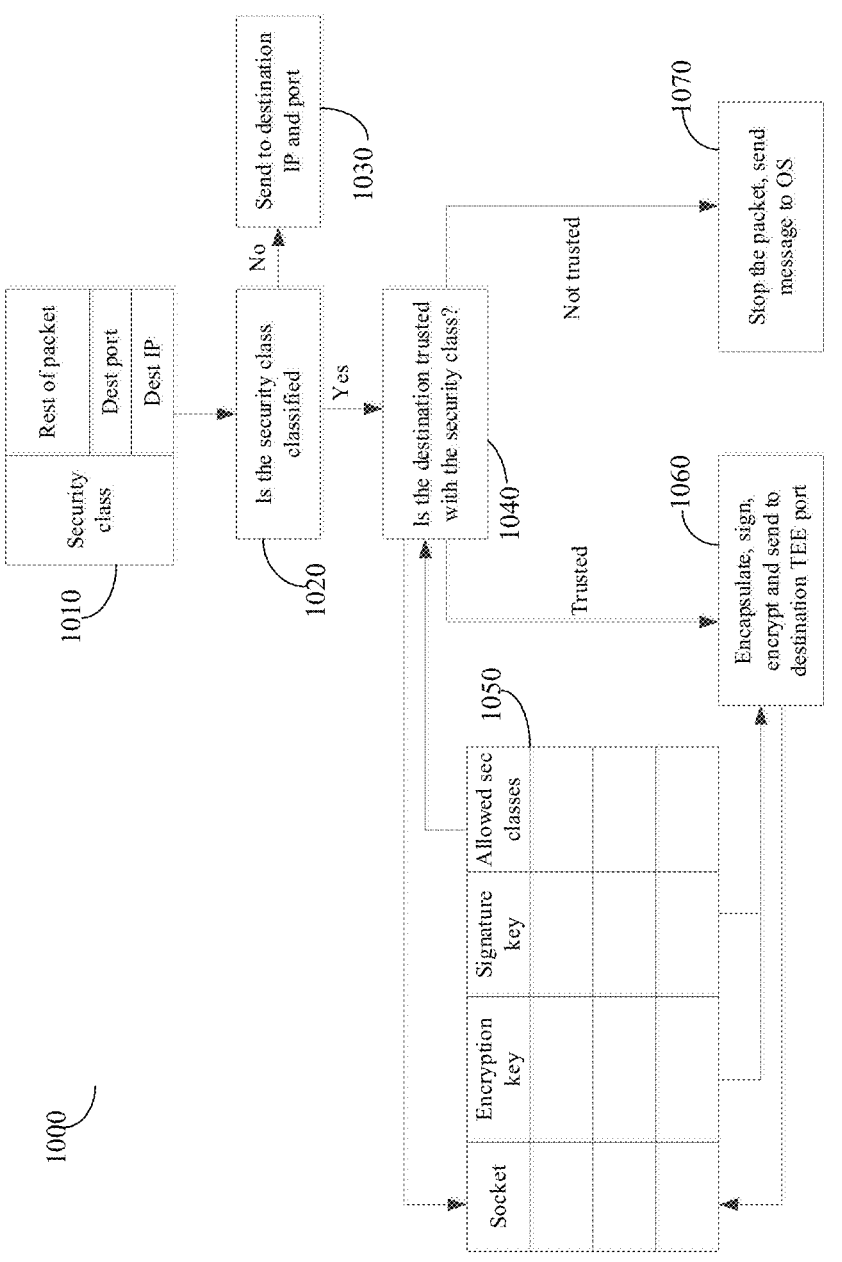
FIG. 10 is a flow of a network interface implemented according to an embodiment.

Reference is now made to FIG. 10 that depicts an example flow 1000 of a network interface implemented according to an embodiment. An interface can request the credentials of the other side either when a connection is established or when secure data is about to be sent to the other side. It has been identified that the disadvantage of requesting the credentials when a connection is established is that most times it is not needed (e.g., a generic browsing session) since the data crossing the interface is not classified in any way.

Accordingly, the disclosed embodiments include techniques for requesting the credentials when a connection is established which provide at least two advantages. The first, it saves time when data starts moving between devices. The second, is because a server TEE may not be able to communicate with the TEE on the client, in order to receive credentials and send classified material. Consider a client opening a connection to a server and requesting a classified file. If the server does not already have the client credentials, it needs to contact the client TEE. But the client TEE has a different port than the port of the OS socket, hence if the client is behind a NAT, there is no way for the server TEE to reach the client TEE. Thus, in an embodiment, the protocol requires that when a client opens a connection to a server (e.g., SYN request), the network interface notifies the client TEE and the client TEE shall attempt to open a connection to the server's TEE. If the protocol is successful, i.e., the other side identified itself as an organization device, the other side is added to a dynamic white list (see, for example, FIG. 10, 1050) that identifies destinations that can receive classified classes, and which classes. The network interface of the server determines that the incoming connection request is to the TEE because of a predesignated port that is used exclusively for TEE-to-TEE communication. In case of a client and a server, the client TEE and the server TEE are communicating confidential information. In an embodiment, packets destined for this port are always routed by the interface to the TEE and never to the OS. Thus, the inter device TEE protocol is as follows (see, for example, FIGS. 12 and 24):

1. The network interface, e.g., interface 910, of the client identifies a SYN request (or any other protocol initiation message) sent to an IP address;
2. The network interface passes the information to the sender TEE 920;
3. The source TEE tries to open a secure connection to the TEE port of the destination machine;
4. If the TEE port is not active:
   a. no ACK received;
   b. the destination does not work according to the protocol (e.g., does not provide the required token); the destination is assumed to be untrusted for classified data;
5. If the TEE port is active (i.e., the machine supports the protocol) and a connection is established, the source TEE requests a security attestation from the destination TEE;
6. The security attestation can be the token from the organization server 930 or a digitally signed certificate. If the attestation is a token, data can move in both directions. If the attestation is a certificate, confidential data cannot be uploaded. The certificate option is used to download secured programs from a vendor site described in more detail herein. The protocol is then similar to TSL, but between TEEs.
7. The client TEE initiates an agreement on a signature protocol and key and on data encryption and a key (out of scope). This effectively opens a tunnel between the client TEE and destination TEE. For the receiving side to understand the data, the data must go through the receiving TEE.
8. The TEEs on both sides configure the interface to send all secure data intended, based on the IP address and port of the other machine, to the same IP, but the TEE port. The original packet is embedded in a new packet;
9. Each side also lists the security levels that can be sent to the other side, based on the capability tokens received.

Returning to FIG. 10, when an outgoing packet 1010 arrives at the interface, if the data is not classified 1020, it is sent to the destination 1030. If the data is classified 1020, the interface checks whether the destination is authorized to receive the security class 1040. If the destination device is not trusted with the class, the packet is dropped and an error message is (can be) sent to the OS 1070. If the destination device is trusted, the interface encapsulates, signs, and encrypts the packet inside a new packet that is sent to the same destination IP, but to the TEE port 1060 of the destination machine. A destination that is not in the table is, by default, not trusted with any class (except the non-classified class). Destinations in the table may be allowed to receive some classes but not others. At the receiving end, the interface recognizes the TEE port, and forwards the packet to the TEE. The TEE removes the encryption, checks the signature, removes the encapsulation and forwards to the OS. Forwarding to the TEE involves the triggering of an interrupt to the TEE and sending the packet either to a dedicated on-chip buffer (not shown), protected by a data security class, that only the TEE can process, or writing to external memory (not shown), with the data security class only the TEE can process.

Figure 11:
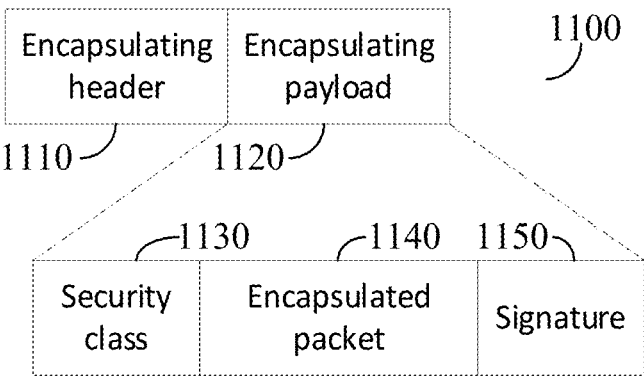
FIG. 11 is a format of a packet containing therein an encapsulated security class according to an embodiment.

FIG. 11 shows an exemplary and non-limiting format 1100 of a packet comprising an encapsulating header 1110 and an encapsulating payload 1120, the latter containing therein an encapsulated security class 1130 according to an embodiment. The first 128 bits of the new payload 1120 are the security class GUID 1130 of the payload in the encapsulated packet. This is followed by the encapsulated packet 1140. The original packet is followed by the signature 1150 of the security class 1130 and the encapsulated packet 1140. The full payload 1120 is then encrypted. The fact that the new payload is signed and encrypted ensures that the security class cannot be changed without the change being detectable according to the principles discussed herein. As with virtual private networks (VPNs), the packet size of the OS packets must be limited so that the encapsulating packet will not exceed the maximum packet size.

Figure 12:
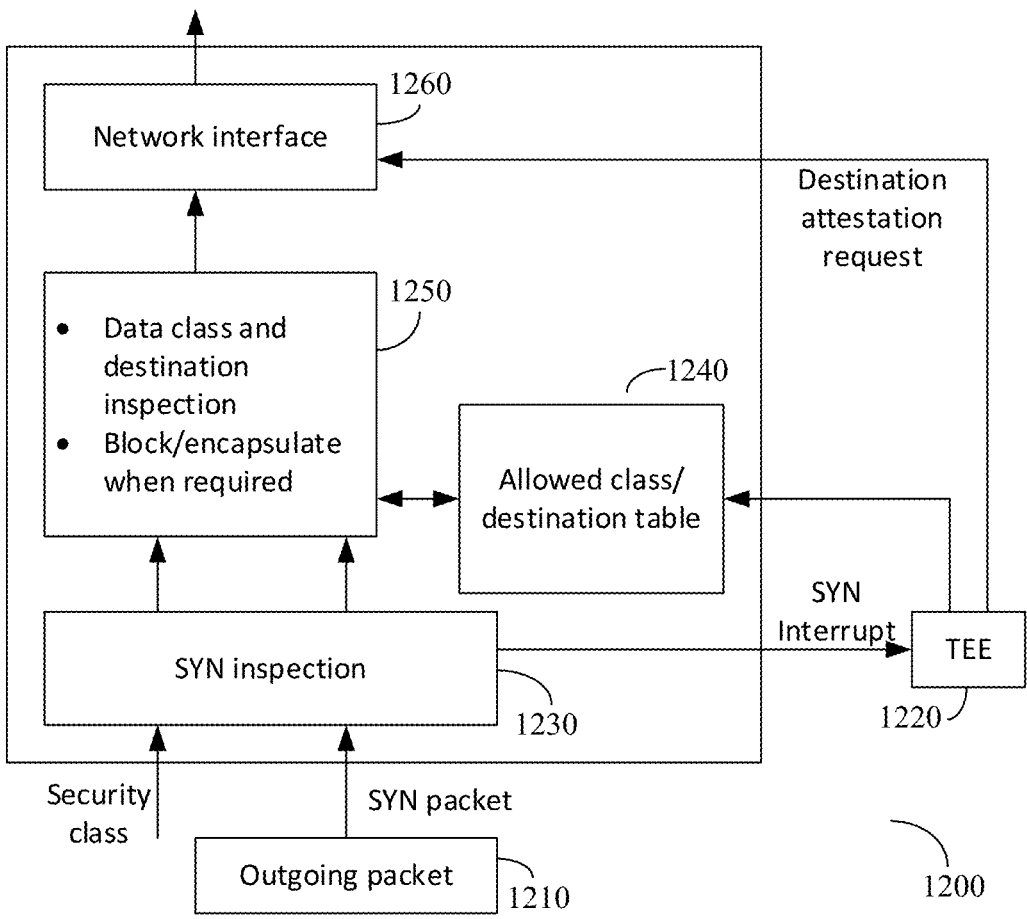
FIG. 12 is a modified network interface block diagram for outgoing packets to detect an opening of a connection, according to an embodiment.

Reference is now made to FIG. 12 that depicts an example modified network interface block diagram 1200 for outgoing packets according to an embodiment. It should be noted that while FIG. 10 focuses on outgoing packets, FIG. 12 focuses on detecting the SYN packet and updating the allowed table. A packet 1210 is read from memory (not shown) and enters the modified network interface 1200 along with its (HW provided) security class. The SYN inspection 1230 checks whether the packet is a SYN packet. If so, the destination IP is forwarded to the TEE 1220 to verify the trustworthiness of the destination. The TEE 1220 executes the authentication protocol with the destination and writes the verdict in the destination table 1240 of the interface 1200. Future classified packets are checked whether they are allowed to be sent. If they are, the interface 1200 encapsulates them in a packet (1250) intended for the destination TEE. If not, the packet is dropped. Once encapsulated, the packet is forwarded to the "legacy" interface 1260 for sending.

Figure 13:
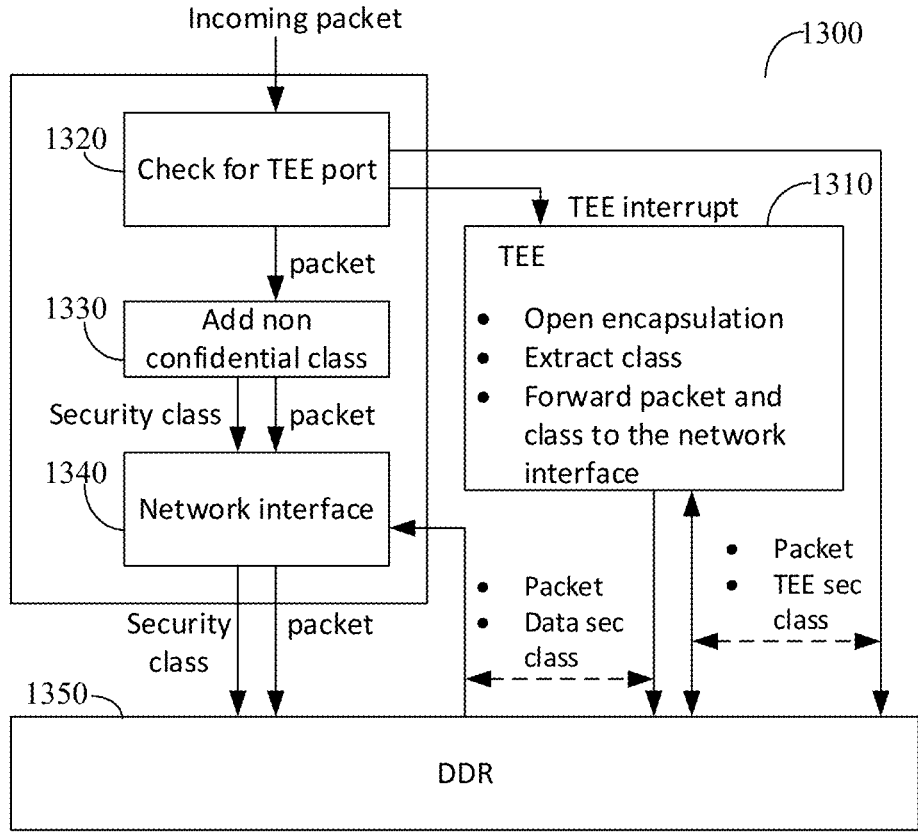
FIG. 13 is a modified network interface block diagram for incoming packets according to an embodiment.

FIG. 13 shows an exemplary and non-limiting modified network interface block diagram 1300 for incoming packets according to an embodiment. Accordingly, a packet is received by the modified network interface. It is first checked for the port number of the TEE 1320. If the TEE is the destination, the packet is written to memory 1350 or to an on-chip buffer (not shown) with the TEE security class and an interrupt is generated for the TEE 1310. If the packet is not intended for the TEE, the non-confidential class is added 1330 to it and the packet continues processing with the "legacy" network interface 1340. For packets intended for the TEE, the TEE opens 1310 the encapsulation, extracts the security class and forwards the encapsulated packet and the security class to the "legacy" network interface 1340. Data may arrive at the "legacy" network interface 1340 via either a dedicated connection or via direct memory access (DMA). There are multiple ways to open an incoming packet the first being with a TEE on the SoC opening all classified packets, i.e., those intended for the TEE port. A second way is with cryptographic engines (see FIG. 10) by allowing the interface to open classified packets. If the GUID is known, the packet is written to memory with the corresponding active GUID. If the GUID is unknown, the packet is forwarded to the TEE. An artisan would readily appreciate that there are other ways to partition the work between an SoC's TEE and the interface, that may be utilized in accordance with the disclosed embodiments.

In an example implementation in which an organization leases virtual machines from a virtual machine (VM) provider, the leased machines can be connected via virtual private network (VPN) to the organization's machines. On the leased VMs, the security classes must be somehow mapped to the organization leasing the VM (e.g., via an organizational prefix in the GUID) such that data cannot be forwarded to machines of a different organization. In another case, opening a connection to an off-premise software as a service (Saas) machine, which may be serving multiple organizations, is a combination of a regular machine to machine connection, and a virtual machine server, hosting machines from multiple organizations.

In an embodiment, for both leased machines in the cloud and SaaS machines serving multiple organizations concurrently, the machines are able to: (1) recognize the organization the connection originated from; and, (2) differentiate data from different organizations. To recognize the organization's server, the organization's name can be added to the channel establishment protocol, and sent with the identity and capability token. This allows the SaaS machine to determine which public key to use in order to open the token. The security matrices prevent data and code of one organization from interacting with data and code of another. For SaaS and cloud services, there can be multiple connections from the same IP (the organization's public IP). Therefore, the interface also inspects for the FIN (close connection) handshake or any other like indication of other protocols. An artisan would appreciate that FIN may indicate that the sending party is closing the connection, i.e., that it will not be sending more packets. Each TEE keeps a reference count on the number of open connections between the two IP addresses and when the count goes to 0, the TEEs also close their connection. In order not to try to open connections to non-secure servers, the client TEE can have a list of IP addresses of common non friendly sites (e.g., news sites, shopping sites, social networks). Since a TEE-to-TEE connection will not be established, they will not be added to the trusted destination table 1240 and will not receive any secure data. This ensures that a TEE-to-TEE connection will not be established between the client TEEs and those untrusted sites.

The principles disclosed herein with respect to the securing of data may be further adapted also for the protection of code, as code pages can also be associated with a corresponding security class in accordance with the disclosed embodiments as discussed herein. Using code security classes, unauthorized code can be prevented from accessing privileged data. Furthermore, using code security classes allows for prevention of side channel attacks, i.e., not allowing data entry unless requested by authorized code. A first approach to achieve such security is in the memory controller, to prevent fetching of data by unauthorized code. The second approach is in the cache hierarchy (and/or CPU pipeline, design decision), that prevents unauthorized code from accessing data that was brought in by authorized code. To deal with interactions between code and data of different security classes a code-data security matrix is used. The code-data security matrix shall have values indicating incompatibility, read authorization, write authorization and read/write authorization. To deal with interactions between code and code of different security classes a code-code security matrix is used. The code-code matrix shall have values indicating incompatibility, call/jump authorization, read authorization, write authorization and read/write authorization.

Figure 14:
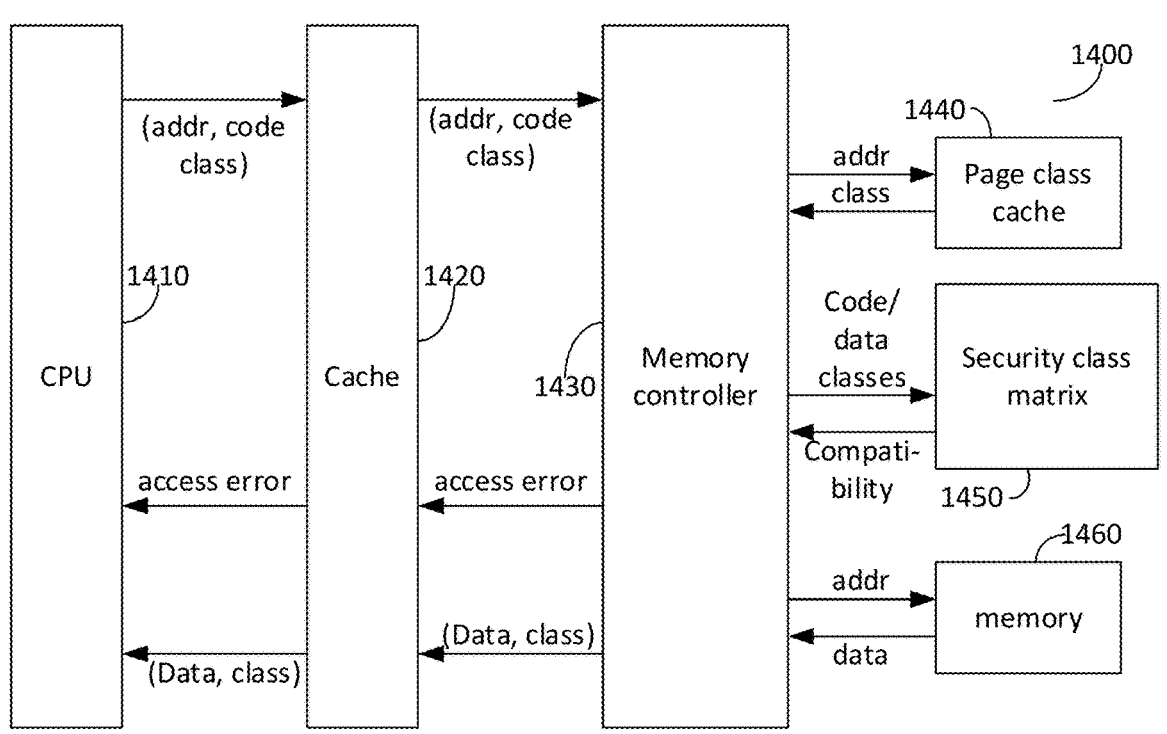
FIG. 14 is a block diagram of checks performed for code-data and code-code compatibility on data reads, according to an embodiment.

Reference is now made to FIG. 14 which shows an example block diagram 1400 of checks performed for code-data compatibility according to an embodiment. The key to preventing data from going from memory 1460 onto a SoC is the memory controller 1430. This is also in line with the moat approach, discussed herein, of putting defenses on the interfaces. The memory controller 1430 stores the class for each memory page and is the only module that can read the class. Therefore, each data/code fetch instruction from the CPU 1410 shall forward not only the address to the controller, but also the class of the instruction requesting the data/instruction. The memory controller 1430 shall have copies of the code-data and code-code security class matrices 1450 that map which code class can access which data class and which code class can call which code class. If the fetching code class is incompatible with the fetched data/code class, the data/code is not to be fetched.

The following may be observed: 1. So as not to add the latency, data can be fetched while the class is checked, but released to the SoC only if allowed. To this end, the data is held if there is a cache miss in the page class cache 1440. 2. The disclosed mechanism prevents unauthorized code from requesting privileged data via the speculative execution mechanisms, since the memory controller 1430 is oblivious to whether a request is real or speculative. 3. Jumping to another address is a request to read an instruction from a different location. If the class of the calling/jumping instruction is incompatible with the class of the jump/call destination, an access error shall be generated. This can be done since the matrix provides values and is agnostic to the semantics of its rows and columns, regardless of whether they are data or code. 4. Just like compatibility checks are made on read requests, they are also made on write requests. 5. For smaller matrices, the security class matrix can be partitioned into three matrices: (a) data-data security matrix; (b) code-data security matrix; and. (c) code-code security matrix. Each matrix outputs the security class of the data result, or a '−1' for incompatibility.

In an embodiment, if the requested data is already in the cache 1420, the respective data security class is also available too. The code-code security matrix is added to the cache 1450 fetching mechanism and the cache generates an access error if the code classes are incompatible. The code-data matrix does not need to be added, if code-data compatibility is checked in the pipeline which is further described with respect of FIG. 15. In an embodiment, without requiring showing a jump access violation, the instruction cache, with the code-code security matrix checks for jump, function call, violations. Further shown are the state of the pipe ahead of the execution stages.

The instruction and the operands are ready hence their security classes are ready too, according to an embodiment. As the instruction and operands have already been fetched, the compatibility of the instruction and each of the operands has already been verified and the resulting security class is attached to the operand.

Figure 15:
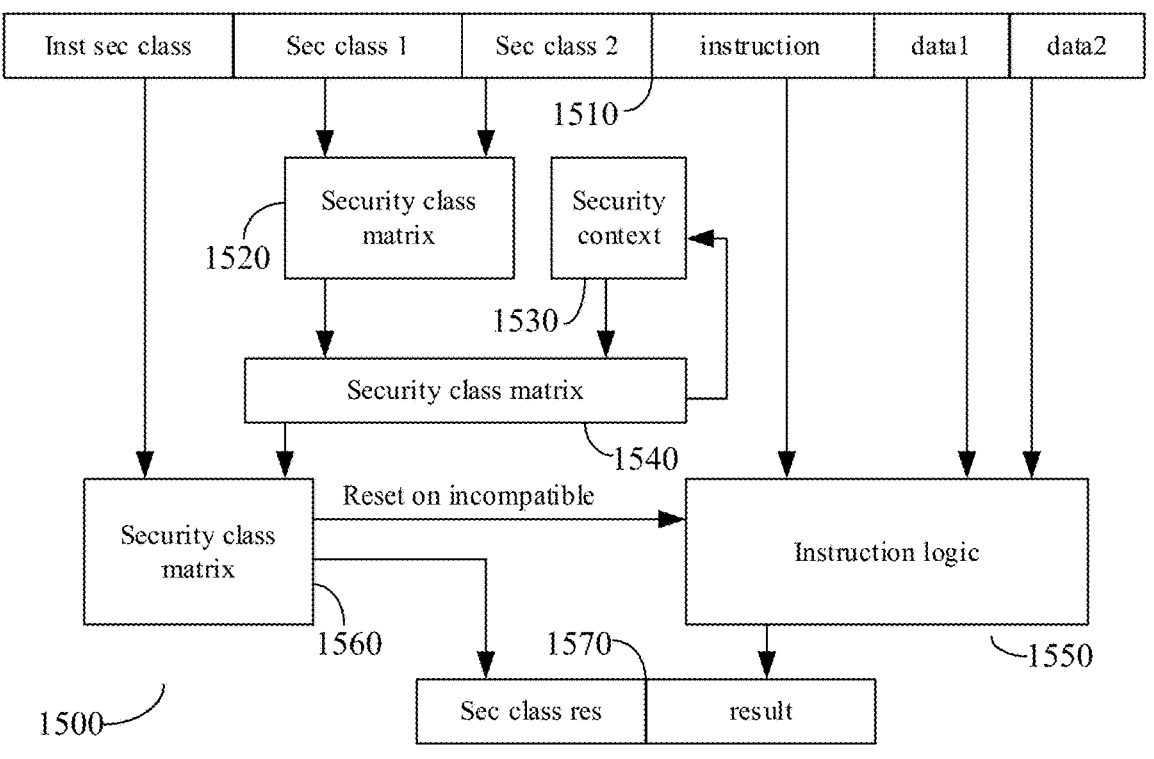
FIG. 15 is a diagram of the secure execution flow within where in case of data-data or data-code incompatibility results are nullified according to an embodiment.

The operation may be further understood from the operation shown in FIG. 15 that depicts an exemplary and non-limiting diagram 1500 of the secure execution flow within where in case of data-code incompatibility results are nullified according to an embodiment. As the instruction logic 1550 is getting the result ready, the operand security classes (Sec class 1 and Sec class 2 of 1510) are checked for the security class resulting from mixing the operands (security class matrix 1520, security context 1530 and security class matrix 1540), and the mixed result is checked (security class matrix 1560) with compatibility with the instruction (Inst sec class of 1510). If at any stage of the class checks an incompatibility is generated, it flows until the last result (code-data compatibility), where it is output to the instruction logic 1550 (any mixing of a class with an "incompatibility", results in an "incompatibility"). The security class matrix 1560 and the instruction logic 1550 generate the security class result+result 1570. During the execution of a program, the operands may have the same security class (e.g., when processing a document) and the code (e.g., processing program) may have the same security class. If classes change, e.g., due to jumps to services, they change slowly. Thus, a possible optimization is to cache the security classes and the matrix result in the class pipeline. If the class inputs are equal to the cached classes, the cached result is the result and there's no need to go to the matrix, which can be farther from the pipeline. Since the pipeline may be running multiple threads, the class cache for a thread is stored and restored on a context switch. In a particular case of a just-in-time (JIT) compiler and self-modifying code, the (i,i) element of the code-code matrix, is read/write enabled. This allows the code to read more code. It also allows the code to write code with the same class. According to an embodiment JIT code or modified code can also have distinct classes.

Direct memory access (DMA) controllers and other accelerators can often generate their own memory transactions; however, they are programmed by the CPU. Until this point, accelerators received the data class of the incoming data. Configuration registers shall also receive the class of the instruction that wrote to the register. Each accelerator can delete the instruction class to registers that do not need to know the instruction class and keep the instruction class for registers that do need to know, e.g., the address registers. The instruction security class can be used to allow only certain code to use an accelerator. When the accelerator requests memory reads, it shall also send the instruction class of the instruction that configured the memory range.

One of ordinary skill in the art should now appreciate the new applications made possible by the disclosures made herein. By providing a security class (or multiple security classes) for OS data such as file system, process control blocks, process memory mapping, etc., non-OS code can be prevented from reading and changing the content of the data. By adding security classes to OS code, it is made possible to allow only specific OS code to handle specific OS data. Data pages are associated with a data security class. When the CPU tries to execute an instruction with an incompatible data security class it generates a HW exception. In an embodiment, in order to protect code areas from writes, the security matrix. Code pages have their security class, and no other class can be written into those pages. The memory page is marked with the class when the first word is written and from then on, the page is accordingly protected. In order to allow for the first write the OS must "free" the page with a special instruction as was already required for shredding classified data, as further discussed herein. A free, unassigned, memory page is either classified as "non classified" or given a class of its own. In both cases, any class can be written to a free page. A security hole may exist if the full page is not written by the code. If the code is read from storage, it is read in block sized increments, which are, for example, multiple memory pages. Even if there are some optimizations on the last page, the memory block had been "freed" earlier, hence it has no classified content. If the block had not been freed, the class of the code would not be compatible with the class of the content, hence would not be written according to the disclosed embodiments.

A return oriented programming (ROP) attack is a technique where code that is unauthorized to perform a task, jumps to code sections that are authorized to perform the task. After the task is performed, the return instruction in the authorized code returns control back to the unauthorized code. By carefully stitching together such jumps, unauthorized code can inflict harm.

Figure 16:
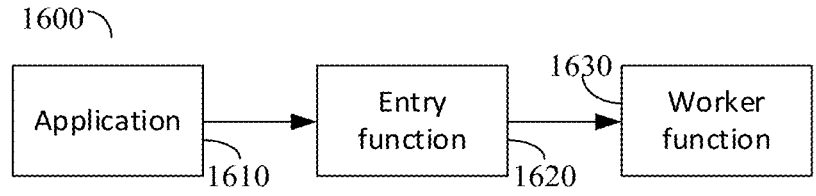
FIG. 16 is a block diagram of funneling call through entry functions according to an embodiment.

Reference is now made to FIG. 16 that is an exemplary and non-limiting block diagram 1600 of funneling calls through entry functions according to an embodiment. It should be noted that, in an embodiment, if the authorized code is OS code, an application cannot be prevented from calling such OS code. This is because such applications may be required to call system calls, OS functions and OS services. As shown in FIG. 16, a technique where the call from an application 1610 is funneled into necessary paths that prevents the caller application 1610 from using any other path. This forces the caller application 1610 to call a legitimate entry point of the service and not a point inside of the service. According, entry functions 1620 are created that are callable by applications 1610. The entry functions 1620 are then authorized to call the corresponding OS worker functions 1630. The entry functions 1620 are placed in the same memory page(s) thus they are all attached a security class that is allowed to be called by applications 1610 and can also call OS worker functions 1630. In an embodiment, applications 1610 cannot call worker functions 1630 directly which according to the principles disclosed herein is enforced by the code-code security matrix.

Figure 17A:
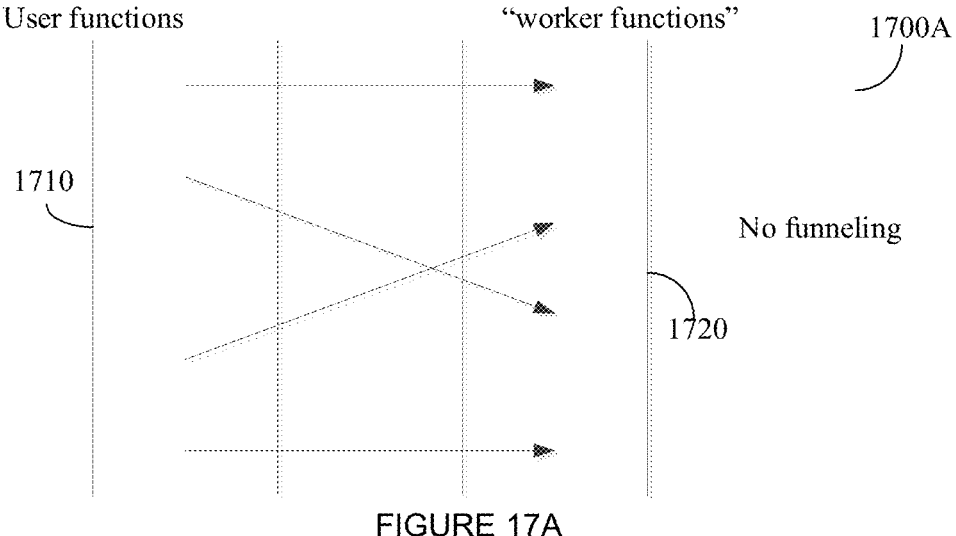
FIGS. 17A-B are communication diagrams illustrating comparing communication flow with and without funneling where user functions cannot call worker functions, and more specifically addresses in a worker function according to an embodiment.
Figure 17B:
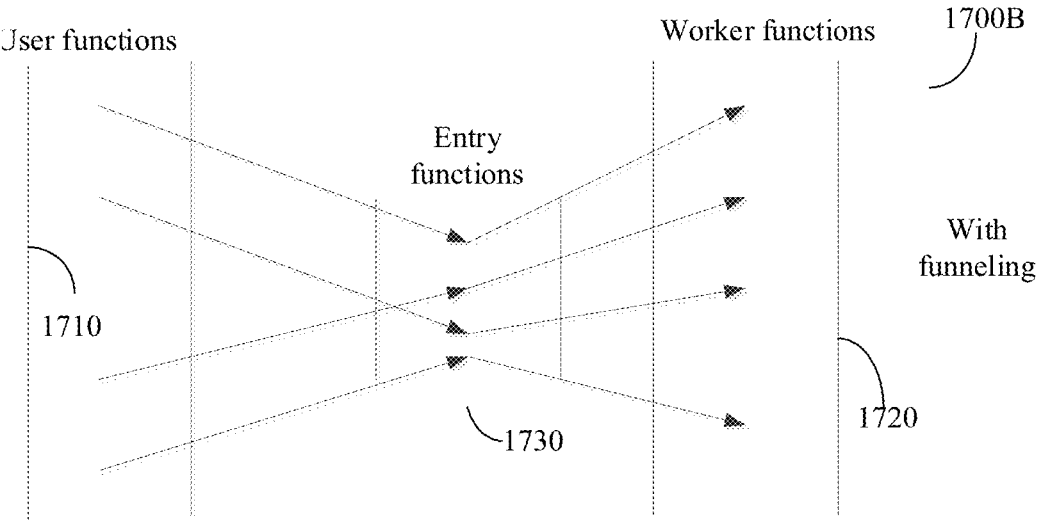

FIGS. 17A-B depict example communication diagrams 1700A and 1700B comparing communication flow with funneling (1700B) and without (1770A) funneling where user functions 1710 cannot call worker functions 1720, and more specifically addresses in a worker function 1720 according to an embodiment. Rather, it is necessary to route call from user functions 1710 to entry functions 1730 so at to access worker functions 1720.

In an embodiment secure enclaves may be used according to principles described herein. Secure enclaves are functions that hold confidential data only they can access, and they provide service to a specific application or a general service. Using code-code security class restrictions, unauthorized calling of the secure enclave function is prevented. With funneling through entry functions, jumps to the enclave code, not through the designed entry point, by unauthorized functions is prevented. In an embodiment, using the code-data security matrix, only the enclave code can access enclave data. It should be appreciated that an advantage of using this scheme for enclaves is that memory is now not limited. There can be as many enclaves as needed, anywhere in memory, thereby providing distinct advantages over solutions where enclave memory usage is limited, thereby making memory usage more efficient and more flexible. Enclave code can be of any size, and likewise, enclave data can be any size. Enclave code and data can be swapped in and out of storage (virtual memory).

In an embodiment, in order to prevent hardware (HW) exceptions that may occur when writing to a memory page as enclave data which could be caused when data is returned, and because no other code can access enclave data, a declassification function is used. Every enclave returning data calls its declassification function only it can call, with the returned data and the return address. The code-data security matrix for the declassifier accepts the enclave security class and converts it to either a predetermined (at the declassification definition time) security class, the non-classified class (which will be converted to the class of the page it is written to), or the flow security class of the calling function. The latter has the advantage over non-classified in that it attaches the correct security class based on the call, whereas writing the non-classified class can be problematic on a new (non-classified) page. This requires the HW to support forwarding of the calling security context to the enclave/de-classifier.

Virtual machines (VMs) provide a separation of execution environments with no shared code or data. By classifying code and data appropriately, and setting the corresponding code matrix accordingly, code from one machine cannot call code from another and cannot read data of the other. By using a plurality of classes per VM, vulnerability to attacks from within the VM is significantly diminished.

Referring now to FIG. 18, an example block diagram 1800 of hardware protection for vehicles using hardware identification for sensor data and driving element commands is presented, according to an embodiment. Vehicles receive data from sensors, e.g., sensors S1 1820 and S2 1830, and send commands to driving elements (DEs), such as braking, steering, accelerating, shown as DE1 1840 and DE2 1850. One of ordinary skill in the art would appreciate that there is risk that malicious data replaces sensor input, e.g., inputs provided by sensors S1 1820 or S2 1830, and sent over the datalink connecting to the CPU 1810. Similarly, a command sent by the CPU 1810 may be replaced when a control command is sent to a driving element, e.g., DE1 1840 or DE2 1850. According to the principles disclosed herein that the system 1800 has the sensors, e.g., sensors S1 1820 and S2 1830, further equipped with a hardware identification (HW ID) that identifies the data as coming from the sensor, A similar approach may be used for the control command that is also provided with a HW ID of the source of the command. Accordingly, sensor processing code verifies that the sensor data has the correct security tag (using the code-data matrix as described in more detail herein) and command generators generate command packets with the correct security class. The sensor IDs and command IDs are generated by the HW.

Hence, the disclosures herein have, among other advantages with respect to worms. A worm moves from one machine to another via direct connection, e.g., USB stick or a wired network, or by wireless connections (e.g., Bluetooth®). This means worms enter a system via an interface. If the interface checks security classes, and if the worm does not have an authorized class, it will be blocked and not allowed to enter. If the interface is on a gateway, controlling access to an internal network, then the worm will not be able to enter the network. Of course, each machine should also protect itself. Another apparent advantage is the use of the disclosed inventions for example in operational technology (OT). Operational technology refers to industrial and infrastructure computing, for example but not by way of limitation, controlling robots in a factory, shipping ports, power plants, water utilities, air traffic control, railway control, etc. Any malware entering a factory or critical infrastructure can cause enormous economic damage and in certain cases, even death. The security classes allow to close off the plant computer infrastructure by not allowing non-secure, unauthorized, code and data to enter the local networks and individual machines. This is done by allowing only authorized classes on the machines. Rogue classes will need to provide both attestation of vendor of code and data to the plant, and the correct security class of the vendor. To achieve this, it will be necessary to further infiltrate a vendor's site, and there too, provide required attestation and class. One of ordinary skill in the art would appreciate that there is an underlying assumption that certificate encryption and digital signatures are "strong" and "unbreakable".

As a non-limiting example a program is downloaded from a well-known software provider, providing a signed program which the client verifies the signature of using, e.g., the public key of the software provider. If the downloaded program passes the integrity check, it may be assumed to be genuine and free of malware. Typically, the format of the code provided includes code sections and data sections. In order to use the proposed protection scheme for accessing code sections and data sections, what's missing from the packing format is the class of each section and the security matrices. The code class can be non-classified, i.e., can be called, jumped into, by any code; cannot call restricted code; and, can process only non-classified data. The code class may be specified, i.e., limiting which code classes can call the code; enabling the code to call (some) restricted classes; and, enabling the code to process (some) restricted data. In an embodiment, in case of entry/worker functions and secure enclaves, there is a mapping (security matrix) of which code sections can read/write/call which data/code sections. Thus, to the code packaging format a readable logical name is added to every code/data section, security classes for each code/data section and the three security matrices.

Accordingly, in an embodiment, the downloaded content first passes through the TEE, so that the TEE can classify the memory pages where it places the content. Therefore, in such an embodiment, the downloaded program must be guaranteed to pass through the TEE first. When the client opens a connection, the TEE is notified and attempts to open a connection to the TEE port in the destination server. Two scenarios may be considered. In the first scenario, the destination is the download web page of the company publishing/selling/storing the program. In the second scenario, the destination server is an IT repository of approved applications.

A platform according to various disclosed embodiments will have opened a connection to the TEE of the publisher web site. That is, according to an embodiment, every device participating in the protection mechanisms discussed herein uses a TEE. The content that is sent therefrom to the TEE is the regular downloadable, potentially encapsulated in another format, with the following additional information: 1) security classes for each code section and for each data section; and, 2) code-code, code-data, data-data matrices indicating (for the classes of the program): a) if a code class can call another code class; b) if a code class can process a data class, and the resulting data class; and, c) if two data classes can be mixed and, if so, the resulting class. In an embodiment, the classes are unique GUIDs, so they do not conflict with classes of another program. The same (section) GUIDs can be used for all downloads, or they can be otherwise generated (e.g., by a SW vendor). According to an embodiment the receiving (downloading) TEE verifies: 1) the code can access either non-classified code and data or code and data with downloaded classes; and, 2) downloaded data can be mixed with non-classified data or with data with downloaded classes. That is, in such an embodiment, a downloaded program cannot claim access rights on GUIDs it does not own.

According to various embodiments, the receiving TEE creates a mapping of (source, GUID) to internal GUID. This has three purposes. First, with the source attached to the GUID, two sources cannot have the same GUID (very small probability but greater than 0). Second, every machine represents the same code and data differently, such that it is impossible to know the corresponding classes on another machine or guess the classes on a machine. Third, the source machine can still send updates of various modules without sending the full package. The format of the downloaded software defines specific section types for code and for data. One of ordinary skill in the art will duly appreciate that additional section types (of code and/or data) may be added to the format since, according to various disclosed embodiments, code/data with different classes cannot be in the same section. The TEE adds the classes and matrices (rules of engagements) to its repository. When the pages are written to storage, the storage block is mapped to the corresponding security class. When the block is read, the memory block is marked with the respective security class and the TEE must add the security class and its rules to the security matrices. In an embodiment and so as to save mapping space, the TEE can map a 128-bit GUID to an Aug. 16, 2024 bit number. This is in essence a "private" unique ID for the security class in the machine.

The download process described herein includes protections of the code and data of a single program. For example, an organization may wish to allow only a specific PDF viewer program to be used on classified documents. Once the software was downloaded to an information technology (IT) repository, other nodes in the organization may access the repository to download IT approved software. Therefore, the organization's IT can manage for each program which data classes it can process, which program classes it can call, and which program classes can call it. Using app and section names, IT can add permissions to the program: which data classes it can process; which program classes it can call; and, which program classes can call it. The TEE translates the logical names to program GUIDs. Thus, IT does not know or assign GUIDs, they are generated by the TEE on the repository server. Consider a scenario where IT brings in a new tool. The new tool comes with a GUID that is different from all other IT GUIDs. The tool is downloaded by a user and the TEE on the user machine sees a conflict with a GUID on the machine and the IT GUID. The receiving TEE must change the non-IT GUID, before installing the new tool. This therefore may include: a) If the program, application, owning the GUID is running, stop the program; b) Changing the mapping (publisher, GUID)→machine GUID to a new machine GUID; c) Changing the mapping of storage blocks from the old machine GUID to the new machine GUID; and, d) Installing the new IT tool.

In embodiment, the security classes for enterprise data are common to all machines. The GUIDs are used for code and for private data of applications/programs. In an embodiment, programs downloaded from the repository, i.e., signed with the enterprise private key, can claim access rights to classes they do not own. A concern may regard the ability of an attacker to know the GUID of some secure code section, download malware with the same GUID and gain access to the secure data of the secure code. However, according to various disclosed embodiments, this is not possible because of several precautions: 1) the non-IT GUIDs are different on every machine thus the malware needs to know the GUID on the particular machine; 2) the GUIDs are sent to the TEE, and from there are accessible only by the TEE or need-to-know HW elements such that they are not exposed to SW running on the CPU; and, 3) only code downloaded from the IT repository can claim access right to classes it does not own, which means malware will need to infiltrate the IT repository and know the IT GUIDs.

FIG. 19 shows an example block diagram 1900 for overhead reduction when using a GUID 1910 according to an embodiment. Downloaded GUIDs 1910 are 128 bits. As noted above the receiving machine can map (1915) 128-bit GUIDs to 16-32 bits 1920, in order to limit the overhead on storage block mapping to security classes. A 16-bit ID can represent 64K classes. A 12-bit ID can represent 4K classes. On a client machine there will probably never be more than 4K active classes, i.e., code and data classes of programs in memory (programs that have been completely swapped out of main memory are not counted). Thus, to limit the overhead of the security matrices and of the control lines and registers required to track the classes, when a program is launched, its classes can be mapped (1925) from the "storage" mapping 1920 to an "active" mapping 1930. The flow for program class overhead reduction according to an embodiment is:

1. The storage controller shall maintain a copy of the mapping from storage classes to active classes. When it reads a storage class it does not have a mapping for, it shall send the storage class to the TEE.
2. The TEE has a mapping from GUID classes to storage classes and an association of the classes that belong to the same program. Thus, the TEE shall issue active classes for all the storage classes of the program and send the mapping, and the required crypto keys, to the storage controller.
3. Once the storage controller has the new mappings, the storage blocks shall be written to memory with the active classes, and the memory controller shall maintain a reference count of classes in memory.
4. When a reference count reaches '0' or is incremented from '0', the memory controller shall notify the TEE. Thus, the TEE shall maintain binary flags for each active class indicating whether their reference count is '0' or greater than '0'. Based on the classes, the TEE shall maintain a flag indicating if the reference count for a program is '0' or greater than '0'.
5. When the reference count for a program increments from 0, the TEE shall read the security matrices of the program and add them to the active matrices at all SoC locations.
6. The locations (CPU caches, CPU pipeline, memory controller, etc.) shall store the new rules in their security caches or in their secure memory.
7. When the reference count of all the classes of a program reaches 0, the TEE shall notify the storage controller to remove their mappings, and the classes can be reused.
8. When the reference count for a program has reached 0, the TEE shall remove its security matrices rules from the SoC.
9. If there are not enough free active classes for the newly launched program, the TEE shall issue an interrupt to the OS whose meaning is to swap out a program.
10. When the OS has swapped out a program according to its swap out heuristic, it shall ACK the TEE.
11. The TEE shall monitor the reference counts for the programs until it can recycle a program's classes. The TEE shall continue requesting swap outs until there are enough free active classes for the new program. It shall then send the mapping for the new program to the storage controller.

One of ordinary skill in the art will appreciate that processes can create other processes, and can create threads. When threads and processes are created, their initial security context may be the security context of the flow in which they are created. It has been identified that threads, and for that matter also processes and subroutines, face challenges in (re) creating their respective security context when they are created or switched in. When they are switched in, it may also be necessary to recreate the security class of the registers, the arithmetic flags and the security-context class. Thread creation is typically done by the OS, via system calls. In x86 architectures a system call can be recognized by the sysenter command, or in Linux®, by the call to interrupt 80. Upon recognizing a system call, the CPU may save the flow security class in a special register, only the CPU has access to. Specifically for thread creation, another method, via special instruction, is detailed below. Switching-in a thread is done by the OS and only the OS knows which thread is being restored. Therefore, the challenge for the HW is to know the thread context that is to be restored. Hence, according to an embodiment, for both thread creation and context switching the OS scheduler shall call dedicated CPU instructions, implemented and owned by the CPU (not external vendors such as OS providers) and running in a CPU owned secure enclave.

A special case of a thread is an interrupt. When the interrupt is first loaded, it starts with a non-confidential security class, just like any program on launch. If the interrupt is interrupted, or switched out for whatever reason, it is handled according to the disclosed embodiments like any other thread that is switched out and then back in.

Reference is now made to example FIG. 20 that shows a hash table 2000 for thread context according to an embodiment. The CPU context (PC, registers and their security class, arithmetic flags, security context) are managed by HW. The OS has dedicated instructions to create, delete, save and restore the context, with the thread ID as a parameter.

When a thread is created, for example Thread 1 2010, or Thread 2 2030, or Thread 3 2060, the OS issues a "create thread" instruction with the thread ID. Empty spaces 2020, 2040 and 2050 may be left for entering future threads, or threads previously used and discarded. The CPU retrieves a structure for the context from a hash table 2000 where the hash key is the thread ID, e.g., 2010, initialize to default values except for the thread ID and security context in effect. For switching-in or switching-out a context, the OS issues the relevant instruction with the thread ID, e.g., Thread 1 2010, as a parameter. The CPU hashes the ID to calculate the address of the data structure for the thread and switch in/out. Similarly, this is performed also for deleting a context. The code used by the OS for context switching and scheduling, performs writes that are protected by the security class of the code.

It should be noted that, when storing and restoring a context, the security class of the registers may also need to be stored and restored. Up until now, the data class affected the class of the page that the data value was written to. This is not the case for store/restore. The security class must be read and stored with the data value, and then written to the security class field corresponding to the register the data is restored to. Store/restore are the only instances where the CPU can read and write to the security class field of the data registers. This ability is enabled and guarded by the security class of the store/restore code. The data pages of the store/restore code have a constant security class that is unaffected by those of the registers (managed by the security matrix). The security class of the store/restore code shall be called the context class.

In an embodiment, to prevent an adversary from masquerading as the context class and changing the security class of the data registers and security context, the context class is owned by the CPU, not by the OS, and is loaded (with signature verification) prior to OS boot (as part of the HW boot, as further discussed herein). The address range of the enclave code and the entry points of the context functions are provided to the OS in registers that are read-only to all classes other than the context class. The context class shall have a fixed class ID, and no other class shall be allowed to use that ID. The enclave data pages can be requested by the enclave from the OS and be switched-in and switched-out based on virtual memory heuristics. In an embodiment, to prevent malware from switching switched-in pages, the context class can only read pages with the context class ID. Enclave data pages can be requested by the enclave from the OS and be switched in and out based on virtual memory heuristics.

Figure 21:
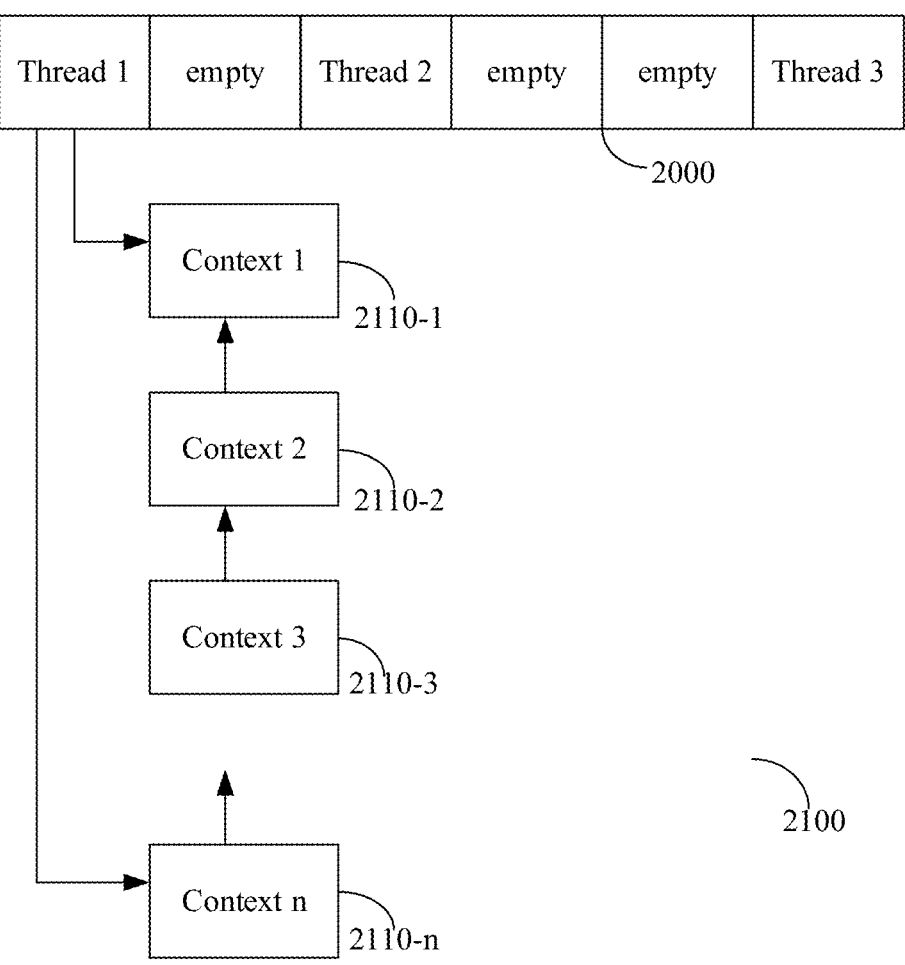
FIG. 21 is a data structure for thread context using a last-in first-out list according to an embodiment.

FIG. 21 is an example data structure 2100 for thread context (call stack) using a last-in first-out list according to an embodiment. For threads, a store and restore instructions were defined when swapping-in and swapping-out. The same method can be used to store/restore functions during function/subroutine calls. Doing so moves the return address, register data and security data (register security class, security flags and security context) to a secure enclave owned by the CPU, and removes the return address and register data from the user stack. This is required in order to store/restore the security context (340 in FIG. 3) when calling subroutines.

By including the program counter, hijacking of the control flow with stack overflows (overwriting the return address) is prevented. By writing the register data and the corresponding security class, setting of the security class for all registers to the max class of the registers is prevented, which could happen if they are all written to a regular memory page as provided for in the prior art (i.e., the user stack). In an embodiment, the way context is stored and restored is with the CPU context enclave. The memory pages for the data share the same context security class. Only code with the context class can read and write to memory with the context class. When the context class code requests a new memory page, on the first write the page receives the context class. When a context class page is released, it is shredded and regains the non-classified class. The threads are still in a hash table 2000 with the thread ID being the key. Each thread structure holds the thread ID and pointers to the first context 2110-1 and last context 2110-$n$, where 'n' is an integer equal to or greater than '1', in a last-in first-out (LIFO) order. In an embodiment, the contexts are fixed structures in an array thus the pointers are indices.

Figure 22:
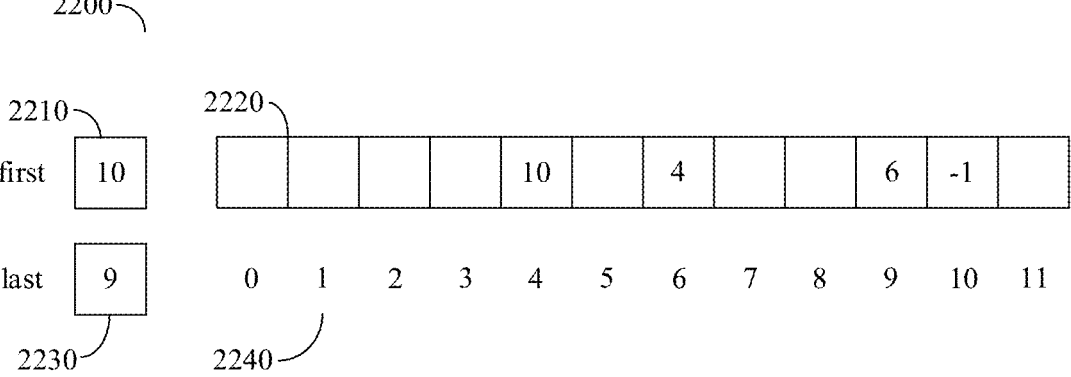
FIG. 22 is a diagram of a free array corresponding to a context array that lists the free, unused, structures in the context array according to an embodiment.

In an embodiment, the context array has a "free" array which is a linked list of free, unused, structures in the context array. This is shown in exemplary and non-limiting FIG. 22 of a free array 2200 corresponding to the context array (not shown in FIG. 22) that lists the free, unused, structures in the context array according to an embodiment. The free list is also arranged as a LIFO structure 2220. The last element inserted points to the previous element, which points to the previous elements, all the way to the first element inserted, which has a NULL backwards pointer. In the example, context 9 of list 2240 is the last to be entered 2230, it points to 6 of list 2240, which points to 4 in the LIFO 2220, which points to 10 in LIFO 2220, the first context 2210. When the context array is full, the code can request a new memory page. The condition where a function returns not to the caller, but multiple call levels may be dealt with according to principles known in the art.

Figure 23:
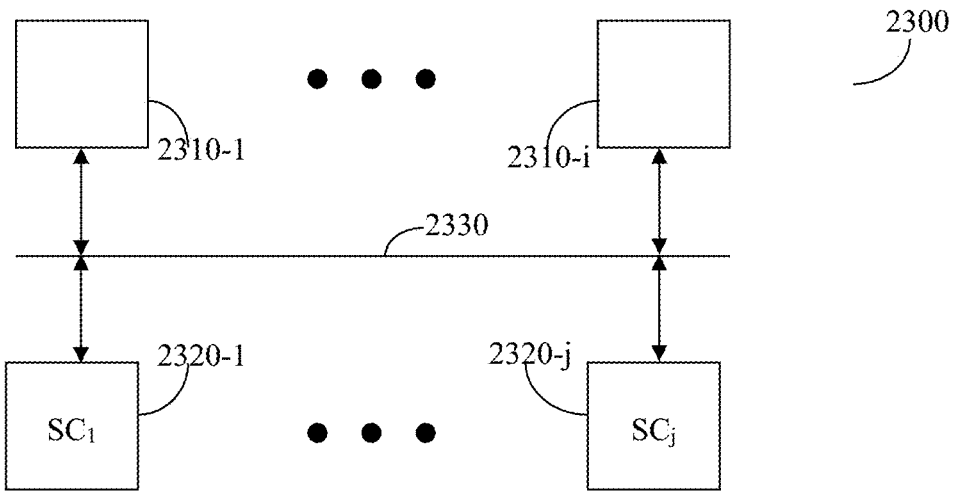
FIG. 23 is a block diagram of a system for secure computing using hardware-based security methods according to an embodiment.

Reference is now made FIG. 23 that depicts an example block diagram of a system 2300 for secure computing using hardware security classifications according to an embodiment. The system comprises one or more processing elements (PEs) 2310, for example 2310-1 through 2310-i, where 'i' is an integer being '1' or greater. A PE 2310 may be, but is not limited to, processors, controllers, accelerators, computational data paths, combinational logic, direct memory access (DMA) controllers, as well as any combinations thereof.

At least one of the PEs 2310 being protected according to the principles described herein, i.e., making use of a security matrix that identifies security classes and allows the determination of data-data, code-code or code-data interaction and determination of the security outcome resulting from such interaction as disclosed herein. The system 2300 further comprises one or more storage controllers (SCs) 2320, for example 2320-1 through 2320-j, where 'j' is an integer being '1' or greater. An SC 2320 may operate as disclosed herein, for example but not by way of limitation, in the manner described with respect of FIGS. 6 and 7.

The PEs 2310 and the SCs 2320 are communicatively connected by an interconnect 2330 which may be a bus, such as but not limited to the like of a host bus, a system bus, an input/output bus, an industry standard bus (ISA), and extended ISA (EISA), a peripheral component interconnect (PCI), a small computer systems interface (SCSI), universal system bus (USB), or the like of a local area network (LAN), wide area network (WAN), virtual private network (VPN), storage-area network (SAN), as well as others, wired or wireless, and any combinations thereof. The interconnect 2330 allows for data and code to flow between PEs 2310, between SCs 2320, and between PEs 2310 and SCs 2320, as the case may require.

In an example implementation, certain systems may have combinations where one or more PEs of a plurality of PEs 2310, but not all, are not protected using a hardware security classes, without departing from the scope of the disclosure. Likewise, certain systems may have combinations where one or more SCs of a plurality of SCs 2320, but not all, are not protected using hardware security classes, without departing from the scope of the invention. That is, at least one PE 2320 and at least one SC 2320 in a system 2300 will be protected using hardware security classes according to the principles disclosed herein. An artisan will appreciate that the system 2300 may further comprise external memories, e.g., DDRs without departing from the scope of the disclosure.

Therefore, according to various disclosed embodiments, all pages in memory and all blocks in storage have a security class. In an embodiment the initial value of the security class is set to a non-classified value, for example '0'. There are three matrices that define the interactions between security classes: a) data-data; b) code-data; and, c) code-code. In an embodiment a value of '−1' indicates incompatibility, no interaction; for data-data, element (x,y) indicates the resulting class when mixing class 'x' and class 'y'; for code-data, element (x,y) indicates whether code 'x' can read/write data 'y', noting that an embodiment there may be separate matrices for read operations and write operations; for code-code, element (x,y) indicates whether code class 'x' can read/write/call code class 'y'; and last but not least, an incompatibility that results in an instruction not being carried out and a generation of a HW exception. The security class of the result of an operation is determined by the security class of the operands, the security context and the security class of the instruction.

Furthermore, classes of the memory pages are managed by the memory controller. When data/code is read from memory: the controller receives the address and the security class of the instruction reading the data, since the memory controller does not distinguish whether the memory page contains code or data, all read and written content may be referred to as data; the controller verifies that the code class of the reading instruction is allowed to access the data class of the page; and, the controller places the data and its security class on the interconnect. When code/data is written to memory: the controller receives the data, its security class and the security class of the instruction writing the data; the controller verifies that the instruction is allowed to write to the security class of the page; and, the controller updates the security class of the page based on its current class, the class of the written data and the security matrix. For faster processing of read or write operations, the mapping can be cached by the memory controller.

According to an embodiment a "shred page" command is added to the instruction set architecture (ISA). It is issued by the OS when it frees a page and is executed by the memory controller. The command writes over secure data. Cache entries from the page shall be shredded or invalidated. In an embodiment, when data/code moves on the interconnect, e.g., interconnect 2330, it always moves with its security class. The security class expands the cache tag. The security class moves up and down the cache hierarchy with the data/code, into the CPU, onto the interconnect. Any snooping/coherency mechanism that reads data from the cache must also read the security class. Every data register in the CPU register file is expanded to hold the security class of the data stored in the register.

According to an embodiment, every execution has a flow security class. The flow security class begins with the non-classified class or the flow security class of the spawning thread. When an arithmetic calculation is done, the security class of the result is added to the arithmetic flags as a new security flag. The flow security class is updated every time there's a conditional branch or a jump to a calculated address. The update is based on the current flow security class, the arithmetic security flag and the security class of the address. When jumping to a subroutine, the flow security class is stored securely by the CPU. It is restored on a return. When a thread/process is switched out, its flow security class is securely stored. When it is switched in, it is restored. The flow security class follows data in on-chip buffers, memory and queues. The buffer/memory can be partitioned into subsections in order to allow storing data from different classes, e.g., cache lines and ways.

In the case where a PE 2310 is an accelerator, the security class of the output of an accelerator can be determined by the security class of the inputs and the configuration, the configurations may be achieved by using registers. If the accelerator accepts a new input only when the current data has finished processing, then the security class can wait for the output. If the accelerator accepts new data once the current data has finished at least one layer of processing, then the output class must travel with the data. If the accelerator reads/writes to memory, the accelerator will also receive the class of the configuration instructions, in order to provide the class to the memory controller.

According to an embodiment all storage blocks are mapped to security classes. Each storage block is encrypted with a key determined by its security class. The class-key mapping is written by a TEE to the storage controller. Only the controller can read the mapping. While the class keys can be the same on all enterprise devices, in an embodiment the class keys are unique on each device. When storage blocks are freed (e.g., files deleted), the OS shall indicate to the storage controller to free the blocks. The storage controller shall set the class to non-secure. Shredding is up to the implementation.

In an embodiment, the classes in storage are in the range of 16-32-bit GUIDs. They may be converted to Oct. 12, 2016-bit GUIDs when read from storage so as to ease implementation overhead. If the storage controller cannot find a reduced GUID for a read GUID, it sends the non-mapped GUID to the TEE. The TEE assigns reduced GUIDs to all the GUIDs of the program and sends them, along with the encryption keys to the storage controller. If there are not enough reduced GUIDs for the program, the TEE sends a GUID resource error to the OS. On receiving a GUID resource error, the OS shall store sleeping programs in virtual memory, in order to free their reduced GUIDs. When done, it shall free their memory pages. The memory controller shall keep a reference count for each reduced GUID. When the reference count reaches 0, it shall send the reduced GUID to the TEE.

Furthermore, according to an embodiment, every device has an enterprise identity. A device, via a TEE, can request an enterprise token that attests to its identity, i.e., the token may indicate the device being a member of the enterprise and security capabilities of the device. When inter-device communications is to be performed and a device opens a connection to another device, the network interface forwards the connection open to a TEE. The TEE opens a secure connection to the same IP, and its TEE port. If a connection is opened, the two TEEs exchange identity tokens to determine whether they are friend (members of the same enterprise or are federated), or foe (no token, no certificate). Accordingly, data, classified or unclassified, can be uploaded to and downloaded from a friend providing a token, secure data can be downloaded, but not uploaded, to a friend providing a certificate; and, only non-classified data can be uploaded/downloaded to/from a foe.

Based on the connection status (foe, friend, one-way, security capabilities) the TEE configures the network interface on the type of data that can be sent to the other side of the connection. When secure packets are sent to a foe/one-way, they are blocked by the interface. When secure packets are sent to a friend, they are forwarded to the TEE, which encapsulates the packet in a secure packet (encrypted and signed) with the security class, and forwards the packet to the TEE port of the receiving machine. When the network interface receives a packet to the TEE port, it forwards the packet to the TEE. When a TEE receives a secure data packet, it opens the encapsulation and writes the original packet (and security class) to the OS buffer. Alternatively, the TEE can return the data and security class to the interface and the interface write the data.

In yet another embodiment, when the CPU requests a memory fetch, the HW attaches the security class of the instruction to the address. If the memory content is in the cache, the cache verifies that the code class is authorized to process the data class of the address, or to jump to the code the address points to. If the memory content is not in the cache, the request is forwarded to the memory controller, which runs the same verifications. If the instruction is not allowed to process the data or to jump to the code, a HW exception is generated. Before writing to memory, the memory controller verifies that the instruction and data are compatible with the security class of the memory page. According to an embodiment, funneling is a method that may be used, whereby code can be jumped to only from a specific code class (the funnel). All other code trying to reach the code must go through the funnel, which guarantees that the jump is to legitimate entry points.

In an embodiment, secure enclaves are formed by providing the code with a unique security class. Only code that is meant to call the enclave is compatible with the code of the enclave. Only the enclave code can read and write (i.e., is compatible with) the enclave data. A secure enclave that returns data to an application, must have a declassify function to change the security class of the data from the enclave security class to the output class. This is done by using the code-data security matrix according to various disclosed embodiments.

Furthermore, applications, programs, can be downloaded with security classes for its code and data. This is done by encapsulating the download format (e.g., PE format in case of Windows) into a format that assigns each code or data section a unique GUID and provides the data-data, code-data and code-code matrices for the rules of interaction among the classes. In an embodiment, the encapsulation is sent to the TEE of the receiving device. The rules downloaded from a publishing house can only include the classes of the downloaded program and the non-classified class. Once downloaded, the TEE of the downloading machine generates a mapping for each (vendor, GUID) tuple to an internal GUID. Only programs downloaded from the enterprise IT repository can include cross program rules of interaction. Programs downloaded from the IT repository already include matrices with internal GUIDs that are not to be changed. If any of the IT GUIDs are already in use (very low probability) on the downloading machine, the downloading machine shall change the GUID it assigned that clashes with the one downloaded from IT.

In an embodiment, the ISA may add instructions to create/delete/switch-out/switch-in a thread/process. When switching out a thread/process or jumping to a subroutine/function, a CPU context enclave shall securely store the registers, security class of the registers, the arithmetic security flags, the security context and the return address. When switching in a thread/process, or returning from a function/subroutine, the CPU enclave shall restore the registers, security class of the registers, arithmetic security class, security context and jump to the return address. The OS process/thread scheduler and process/thread creator shall be the only codes allowed to call the context enclave. The CPU shall call the enclave on JSR and RET instructions. The enclave shall maintain separate context stacks/queues for each thread/process.

Figure 24:
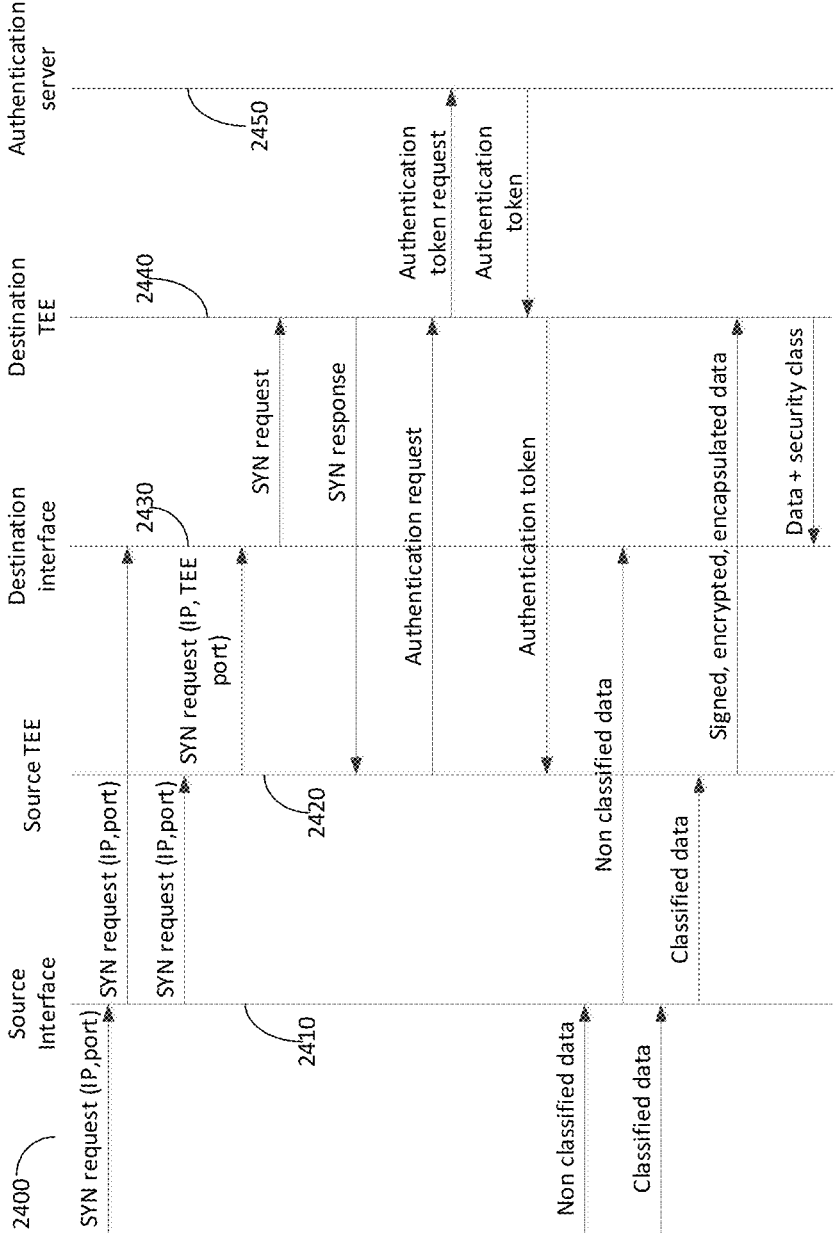
FIG. 24 is a communication diagram according to an embodiment.

Reference is now made to FIG. 24 which depicts an example communication diagram 2400 of a system operative according to embodiments described herein. The communication involves a source interface 2410, a source TEE 2420, a destination interface 2430, a destination TEE 2440 and an authentication server 2450. The communication begins with a SYN request sent from the source interface 2410 that reaches both source TEE 2420 and destination interface 2430. The source TEE 2420 send another SYN request to the destination interface 2430. The SYN request is now sent to the destination TEE 2440 from the destination interface 2430 and a SYN response is thereafter sent to the source TEE 2420. The source TEE 2420 responds with an authentication request to the destination TEE 2440. The destination TEE 2440 sends an authentication token request to the authentication server 2450 which duly responds with an authentication token sent to destination TEE 2440. The authentication token is then forwarded from the destination TEE 2440 to the source TEE 2430. Thereafter non-classified data and classified data may be sent between the source and destination. That is, non-classified data from the source interface 2410 is directed to the destination interface 2430. In contrast, classified data is sent to the source TEE 2420, it is then signed, encrypted and encapsulated before being sent to the destination TEE 2440, that in turn returns the data and its associated security class to the destination interface 2430.

Figure 25:
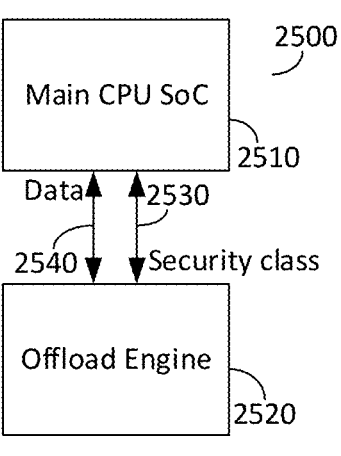
FIG. 25 is a block diagram of offload to an offloading engine according to an embodiment.

Reference is now made to FIG. 25 which depicts an example block diagram 2500 of offload to an offloading engine 2520 according to an embodiment. An offload engine 2520, may be an SoCs that performs specific services for a main SoC 2510, such offload engines include but are not limited to, modems, graphics SoCs, artificial intelligence SoCs, and the like. In an embodiment, such offload engines 2520 may: a) communicate only with the main SoC 2510 forming a closed ecosystem and having their own memory; b) communicate with multiple SoCs in the system; or, c) communicate with external devices (e.g., modem) via a network. In an embodiment, as the fan in/out of the offload engine 2520 increases (i.e., it communicates with multiple sources and destinations), and if a security system is required to continue to protect the data, the offload engine 2520 also implement the infrastructure and protocols disclosed herein. That is, the main CPU SoC 2510 communicates not only through data communication 2540 but also the security class 2530. A networking SoC, modem, is required to implement the protocols with the TEE, the dynamic white list tables as well as identify SYN and FIN messages.

In an embodiment, an offload engine 2520 with its own DDR memory, communicating with a single data source at a time (i.e., receive data, process data, return results) does not need to implement the security infrastructure, as the source of the data can mark the class of the data it sent and reapply it once the results are received. In another embodiment, an offload engine 2520 communicating concurrently with multiple data sources, whether within the system (i.e., no networking) or with sources and destinations over a network, implement the security infrastructure in order to be considered secure. For all offload engines 2520, it is presumed that the SW used is loaded and authenticated during a boot up process and the memory location of the code is write protected. This means there is no dynamic loading of code and no changing of the code while the offloading engine 2520 is on. SW updates may still happen, but a reboot of the offloading engine 2520 is required in order for the updated code to be used. If the offload engine is on the SoC, it is subject to the same requirements as an off-chip offload engine.

Thus, the disclosed embodiments allow for improving a system's ability to protect data, data modified by code, and code, as they flow within a system or are addressed at the entry and/or exit point of interface of the system. Hence, the solutions presented herein overcome the need to place data, data modified by code, or code in a particular location so as to be protected at a desired level. Rather, by providing the security class that tracks the content it protects and is updated when interactions occur between elements having different levels of security, or prevention thereof, that a more efficient and robust security system is provided.

It should be further appreciated that all code and data are assigned, according to various disclosed embodiments, a respective security class. Rules of interaction between security classes define what is allowed as well as the resulting security class of such interactions. As a result, any violation of the rules is detectable in real time, and may further identify the violating code. In various embodiments, when confidential data is directed to cross a protected interface, if the destination is not identified as a friend, it is considered to be a foe and such data is blocked by the interface from crossing its boundary. In the cases where the destination is identified as a friend, the security class crosses the interface accompanying its respective data or code. Accordingly, interfaces, including but not limited to network interfaces, preserve the security class of the data or code that cross them.

Therefore, according to an embodiment a system for secure computing comprises: an interconnect of the system; at least a processing element (PE) communicatively connected to the interconnect, the processing element adapted to handle matrices that define interactions between security classes of data and code handled by the processing element; and, a storage controller (SC) communicatively connected to the interconnect, the SC adapted to handle data with respect of read operations and write operations based on at least a security class associated with the data. In an embodiment a PE is one of: an accelerator, a processor, a controller, a combinational logic, a data path, and a direct memory access (DMA) controller.

In another embodiment a secured system comprises: a plurality of first memory cells adapted to contain therein a security class, wherein each data in the system is assigned a security class that remains associated therewith; a plurality of second memory cells adapted to contain therein a security class, wherein each code in the system is assigned a security class that remains associated therewith; wherein upon an attempted interaction between a first data and a second data of the each data in the system it is checked whether their respective security classes permit interaction and if so a first resultant security class is generated based on the security classes associated with the first data and the second data; wherein upon an attempted interaction between a first code and a second code of the each data in the system it is checked whether their respective security classes permit interaction and if so a second resultant security class is generated based on the security classes associated with the first code and the second code; wherein upon an attempted interaction between a third code and a third data of the each code and each data in the system it is checked whether their respective security classes permit interaction and if so a third resultant security class is generated based on the security classes associated with the third code and the second data; and, wherein upon determination that an interaction is not permitted based on the respective security classes the attempted interaction is prevented.

In yet another embodiment a memory controller is adapted to operate with memory pages, each being associated with a security class. Accordingly, when a read instruction reaches the memory controller, the memory controller verifies that the security class of the instruction can read the security class of the data or code being read from memory. Furthermore, if the security class of the instruction is not allowed to read the data or code, the data/code is not read, and an error is returned. Furthermore, when code and/or data are read from memory, they are read onto the interconnect with their respective security class. Furthermore, when code or data is written to memory, the memory controller verifies that the security class of the data can be merged with the security class of the page, as well as determining the resulting class. Furthermore, when code or data are written to memory, the memory controller verifies that the security class of the code attempting the write can process (i.e., write) to the security class of the page. Furthermore, if the security classes of the data and page cannot be merged and generating an error and the data is not written. Furthermore, if the security class of the instruction attempting the write cannot write to a page with the security class of the target page, generating an error and the data is not written.

According to an embodiment, when code is transferred over the interconnect of, for example, the SoC, it moves with its corresponding security class. According to another embodiment, when data is transferred over the interconnect of, for example, the SoC, it moves with its corresponding security class.

In yet another embodiment a processing element is adapted to operate such that when code and/or data arrive at a buffer/cache, they are stored with their respective security class. Accordingly, when the processing element reads an instruction from the buffer/cache, it is read with its security class. Furthermore, when processing element reads data from the cache, it is read with its security class. Furthermore, during execution of an instruction, the processing element verifies that data security classes of operands can be merged in the same instruction as well as in the resulting class. Furthermore, during execution of an instruction, the processing element verifies that the security class of the instruction can process the resulting security class of the merged data or class of the data if there is just one operand. Furthermore, if the security classes of the operands cannot be merged in the same instruction, an exception is generated, and the instruction is aborted. Furthermore, if the security class of the instruction is not allowed to process the security class of the data or merged data, an exception is generated, and the instruction is aborted. Furthermore, when a result of an instruction is written to a register, it is written with its respective security class. Furthermore, when a result of an instruction is written to a buffer/cache, it is written with its respective security class. Furthermore, if the security class of the written data cannot be merged with the security class of a cache line, an exception is generated, and the write is aborted. Furthermore, on every context change or subroutine jump initiated by the processing element, a security Trusted Execution Environment (TEE) stores all context registers, along with their security class, in secure memory. Accordingly, when a context is reloaded, or returned from a subroutine jump, the context is reloaded by the TEE, along with the security classes.

In yet another embodiment a network interface is adapted to operate such that when a machine opens a connection to another a target machine, the network interface of the initiating machine requests mutual attestation from the network interface of the target machine. Thereafter, upon both machines being satisfied that the other machine belongs to the same organization, a proof request for the data and/or code security classes is requested to establish that the other machine is authorized to store and/or process. Accordingly, when an initiating machine tries to send data to a target machine, the network interface verifies that the target machine is authorized to process/store the security class of the data. If the target machine is authorized, the data is sent, along with its respective security class; otherwise, the network interface generates an error and blocks the data from leaving the initiating machine. Furthermore, when the initiating machine tries to read data from the target machine, the network interface on the target machine verifies that the initiating machine is authorized to receive the security class of the data. If authorized, the data is sent, along with its respective security class. Otherwise, the network interface generates an error and blocks the data from leaving to the initiating machine. Furthermore, when code and/or data enters a machine, the network interface verifies that the machine is authorized to accept the security class of the code and/or data. If authorized, the code and/or data is allowed to enter the machine. Otherwise, the network interface generates an error, and the code and/or data is blocked. In an embodiment, security actions of the network interface can also be forwarded to a security TEE.

In yet another embodiment a storage controller is adapted to operate such that when code and/or data arrives at the storage device, it arrives with its respective security class. Furthermore, when code and/or data is written to a block of the storage device, it is encrypted with a key mapped to the security class of the content being written, and the security class of the content is mapped to the block. Furthermore, when code and/or data is read from a block of the storage device, it is decrypted with a key mapped to the security class of the content of the storage block. Furthermore, when data and/or code are read from the storage device it is accompanied by its respective security class.

In yet another embodiment, when packaging software, each section of code or data is associated to a security class. Furthermore, when the software arrives at a machine, a security TEE in the receiving machine opens the package and associates each section of code or data with the respective security class attached thereto.

It should be noted that the various disclosed embodiments that include methods or processes can be implemented via a processing circuitry and a memory, the memory containing instructions that, when executed by the processing circuitry, configures the processing circuitry to perform the process or method. Likewise, hardware components that are configured to execute code may be realized as combinations of a processing circuitry and a memory containing instructions including the code.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A system for secured computing comprising:
an interconnect;
a processing element communicatively connected to the interconnect; and
a memory controller communicatively connected to the interconnect and to a memory;
wherein access of a memory block by the memory controller to and from the interconnect is accompanied by a security class of a plurality of security classes;
wherein each memory block is associated with a security class assigned to the content stored in the memory block from amongst a plurality of security classes;
wherein the associated security class of each memory block travels in the system together with the content of the associated memory block;
wherein the memory controller employs at least one matrix;
wherein the at least one matrix defines interactions between the security classes of memory blocks of content as the content of the memory blocks which are being handled by at least the memory controller;
wherein the security classes include i) data classes which are security classes for data and ii) code classes which are security classes for processor instructions; and
wherein the at least one matrix defines: i) memory blocks associated with which data classes can be mixed in an operation, as well as determining a result of each such mixing; ii) whether code in a memory block associated with a code class can process content of a memory block associated with a specific data class, as well as determining a resulting class for the memory block resulting from the processing when such processing occurs; and, iii) whether a memory block associated with one code class can call a memory block associated with another code class.

2. The system for secured computing of claim 1, wherein the memory block contains at least one of: data or code.

3. The system for secured computing of claim 1, wherein a set of rules defines allowed interactions between the plurality of security classes.

4. The system for secured computing of claim 3, wherein the set of rules is applied to determine which data classes of the plurality of security classes can be mixed in an operation.

5. The system for secured computing of claim 3, wherein the set of rules is applied to determine at least a result when a first class of the plurality of security classes is mixed with a second class of the plurality of security classes.

6. The system for secured computing of claim 3, wherein the set of rules is applied to determine whether a first class of the plurality of security classes associated with code can process a second class of the plurality of security classes.

7. The system for secured computing of claim 3, wherein the set of rules is applied to determine whether a first class of a plurality of security classes may call a second class of a plurality of security classes.

8. The system for secured computing of claim 3, wherein the rules of interaction for code pages are used to create a secure enclave.

9. The system for secured computing of claim 8, wherein the secure enclave allows for a specific code to access a specific data.

10. The system for secured computing of claim 1, wherein a security context is generated by the system.

11. The system for secured computing of claim 10, wherein generating a security context is based on determination of a control flow of a program executed by the processing element.

12. The system for secured computing of claim 11, wherein the security class of a data operation is at least the security context.

13. The system for secured computing of claim 1, further comprising:
a circuit interface to devices external of the system, wherein the circuit interface is connected to at least one of the processing element and the memory controller.

14. The system for secured computing of claim 13, wherein the circuit interface is configured to prevent classified data from leaving the system to at least an untrusted site communicatively connected to the circuit interface.

15. The system for secured computing of claim 13, wherein the circuit interface is configured to prevent unauthorized data to enter the system.

16. The system for secured computing of claim 13, wherein the circuit interface is configured to prevent unauthorized code from entering the system.

17. The system for secured computing of claim 13, wherein the circuit interface is configured to permit a data to exit the system to an external device connected to the circuit interface, upon determination that the external device is eligible to receive the data having a particular security class.

18. The system for secured computing of claim 13, wherein the circuit interface is configured to permit a code to exit the system to an external device connected to the circuit interface, upon determination that the external device is eligible to receive the code having a particular security class.

19. The system for secured computing of claim 13, further configured to encrypt any one of data or code upon storing the data or the code in a storage that is communicatively connected to the circuit interface.

* * * * *